United States Patent [19]
Tanaka et al.

[11] Patent Number: 6,081,504
[45] Date of Patent: Jun. 27, 2000

[54] APPARATUS AND METHOD FOR CELL DISCARD

[75] Inventors: Kenji Tanaka; Tomonobu Takashima; Takeshi Tanaka, all of Kawasaki, Japan

[73] Assignee: Fujitsu Limited, Kawasaki, Japan

[21] Appl. No.: 08/034,858

[22] Filed: Mar. 19, 1993

[30] Foreign Application Priority Data

Mar. 19, 1992 [JP] Japan ................................... 4-063992
Mar. 17, 1993 [JP] Japan ................................... 5-057116

[51] Int. Cl.[7] .............................. H04L 12/26; H04L 12/56
[52] U.S. Cl. ......................... 370/230; 370/235; 370/395
[58] Field of Search .......................... 370/60, 60.1, 94.1, 370/61, 85.6, 17, 13, 79, 84, 99, 230, 231–235, 468, 253, 395, 465, 474, 469; 340/825.5, 825.51

[56] References Cited

U.S. PATENT DOCUMENTS

| | | |
|---|---|---|
| 4,769,810 | 9/1988 | Eckberg, Jr. et al. . |
| 4,769,811 | 9/1988 | Eckberg, Jr. et al. . |
| 4,849,968 | 7/1989 | Turner . |
| 4,896,316 | 1/1990 | Lespagnol et al. . |
| 4,918,687 | 4/1990 | Bustini et al. ......................... 370/60.1 |
| 4,942,569 | 7/1990 | Maeno ..................................... 370/60 |
| 4,964,119 | 10/1990 | Endo et al. . |
| 4,970,720 | 11/1990 | Esaki ..................................... 370/94.1 |
| 4,984,264 | 1/1991 | Katsube . |
| 4,993,024 | 2/1991 | Quinquis et al. . |
| 5,007,043 | 4/1991 | van den Dool et al. . |
| 5,007,048 | 4/1991 | Kowalk . |
| 5,014,260 | 5/1991 | Wicklund ............................. 370/94.1 |
| 5,038,345 | 8/1991 | Roth . |
| 5,050,163 | 9/1991 | Van Bavel et al. . |
| 5,062,106 | 10/1991 | Yamazaki et al. . |
| 5,081,620 | 1/1992 | Girard et al. . |
| 5,084,867 | 1/1992 | Tachibana et al. . |
| 5,130,985 | 7/1992 | Kondo et al. ......................... 370/85.6 |
| 5,132,966 | 7/1992 | Hayano et al. . |
| 5,138,607 | 8/1992 | Thiebaut et al. . |
| 5,140,584 | 8/1992 | Suzuki ..................................... 370/60 |
| 5,140,588 | 8/1992 | Danner . |
| 5,142,653 | 8/1992 | Schefts . |
| 5,166,894 | 11/1992 | Saito . |

(List continued on next page.)

FOREIGN PATENT DOCUMENTS

| | | |
|---|---|---|
| 0293314 | 11/1988 | European Pat. Off. . |
| 0310173 | 4/1989 | European Pat. Off. . |
| 0366635 | 5/1990 | European Pat. Off. . |
| 0381275 | 8/1990 | European Pat. Off. . |
| 0383660 | 8/1990 | European Pat. Off. . |
| 0384758 | 8/1990 | European Pat. Off. . |
| 0387958 | 9/1990 | European Pat. Off. . |

OTHER PUBLICATIONS

Flow Control in Computer Networks, Experiments in Congestion Control Techniques, J.C. Majithia, Ph.D., et al 1979, pp 211–234.

(List continued on next page.)

Primary Examiner—Chau Nguyen
Assistant Examiner—Soon-Dong Hyun
Attorney, Agent, or Firm—Staas & Halsey LLP

[57] ABSTRACT

A cell-discard control apparatus includes an encoding unit for encoding voice/image information in accordance with a prescribed coding scheme. An information dividing unit divides the encoded data into basic information data and detail information data. A basic information cell assembling unit assembles the basic information data into basic information cells. A detail information cell assembling unit assembles the detail information data into detail information cells. A basic information multiplexing unit multiplexes basic information of a plurality of channels for transmission. A detail information multiplexing unit multiplexes detail information of the plurality of channels for transmission. A cell output unit outputs the basic information multiplexed cell and the detail information multiplexed cell and preferentially discards the detail information multiplexed cell in the event of congestion.

14 Claims, 23 Drawing Sheets

U.S. PATENT DOCUMENTS

| | | | |
|---|---|---|---|
| 5,179,557 | 1/1993 | Kudo | 370/60 |
| 5,233,606 | 8/1993 | Pashan et al. | |
| 5,267,232 | 11/1993 | Katsube et al. | |
| 5,280,483 | 1/1994 | Kamoi et al. | |
| 5,315,591 | 5/1994 | Brent et al. | 370/85.6 |
| 5,390,176 | 2/1995 | Schoute et al. | |

OTHER PUBLICATIONS

IEEE Communications Magazine, New Directions In Communications for Which Way to the Information Age?), Jonathan S. Turner, Oct., 1986, vol. 24, No. 10, pp 8–15.

IEEE Transactions On Communications, Flow Control: A Comparative Survey, Mario Gerla et al, vol. Com. 28, No. 4, Apr. 1980, pp 553–574.

IEEE Network Magazine, Toward A Broadband Congestion Control Strategy, C. Anthony Cooper et al, May 1990, pp 18–23.

International Switching Symposium 1987, Proceedings, Synchronization Aspects of ATD–IBC Networks, F. van den Dool, Mar. 15–20, 1987, vol. 4 of 4, pp B12.1.1–B12.1.5.

International Conference on Communications, Open Issues Regarding the Universal Application of ATM for Multiplexing and switching in the B–ISDN, M. Decina, Jun. 23–26, 1991, vol. 3 of 3, pp 39.4.1–39.4.7.

Proceedings of the 11th Int'l Teletraffic Congress, Approximations for Bursty (and Smoothed) Arrival Queuing Delays Based on Generalized Peakedness, A.E. Eckberg, Jr., Kyoto, Japan (ITC–11), Sep. 4–11, 1985, pp 331–335.

XIII International Switching Symposium, An ATM Switching System Based on a Distributed Control Architecture, Takeo Koinuma, et al, Stockholm, Sweden, May 27–Jun. 1, 1990, vol. 5, pp 21–26.

IXV Int'l Switching Symposium, The Spacing Policer, An Algorithm for Efficient Peak Bit Rate Control in ATM Networks, Eugene Wallmeier et al, Yokohama, Japan, Oct. 25–30, 1992, vol. 2, pp 22–26.

IEEE InfoCom '90, Comparative Performance Study of Space Priority Mechanisms for ATM Networks, Hans Kroner, Jun. 3–7, 1990, pp 1136–1143.

Int'l Journal of Digital and Analog Communication Systems, An Approach to Controlling Congestion in ATM Networks, A.E. Eckberg, Jr., et al, Apr.–Jun. 1990, vol. 3, No. 2, pp 199–209.

ITC Specialist Seminar, Bandwidth Management: A Congestion Control Strategy for Broadband Packet Networks— Characterizing the Throughput–Burstiness Filter, A.E. Eckberg, et al, Adelaide, 1989, Paper No. 4.4, pp 1–8.

T1 Contribution T1S1.5/90–96, Working Group T1S1.5 Contribution, B–ISDN/ATM Congestion Control Capabilities, A.E. Eckberg, Apr. 16–20, 1990, pp 1–6.

B–ISDN Technical Workshop, Underlying Issues and Objectives, and an Overall Control Framework, For ATM Resource and Traffic Management, A.E. Eckberg, Phoenix, Arizona, Mar. 19–21, 1991.

Computer Communications Review, Virtual Clock: A New Traffic Control Algorithm for Packet Switching Netowrks, L. Zhang, vol. 20, No. 4, SigComm '90 Symposium, pp. 19–29, Sep. 24–27, 1990.

IEEE Globecom '91, Tagging Versus Strict Rate Enforcement in ATM Networks, A. Gravey et al, Phoenix, Arizona, vol. 1, Dec. 2–5, 1991, pp. 9.5.1–9.5.5.

IEEE Journal on Selected Areas in Communications, Voice Packetization and Compression in Broadband ATM Networks, K. Sriram et al, vol. 9, No. 3, Apr., 1991, pp 294–304.

IEEE Pacific RIM Conference on Communications, Computers and Signal Processing, Priority Queuing Strategies for Traffic Control at an ATM Integrated Broadband Switching System, Arthur Y–M, Lin et al, May 9–10, 1991, pp. 429–432.

1990 Int'l Zurich Seminar on Digital Communications, The Policing Function in an ATM Network, Denissen, F. et al, Mar. 5–8, 1990, pp. 131–144.

The Int'l Symposium on Subscriber Loops and Services (ISSLS '88), The "Policing Function" to Control User Access in ATM Networks—Definition and Implementation—, W. Kowalk, et al, pp. 12.2.1–12.2.6.

Int'l Journal of Digital and Analog Communication Systems, A Reasonable Solution to the Broadband Congestion Control Problem, C.A. Cooper et al, vol. 3, Apr.–Jun., 1990, pp. 103–115.

Int'l Journal of Digital and Analog Communication Systems, ATM Traffic Control for Guaranteed Performance, R. Kositpaiboon et al, vol. 3, Apr.–Jun., 1990, pp. 117–125.

Int'l Journal of Digital and Analog Communication Systems, A Congestion Measure for Call Admission and Traffic Engineering for Multi–Layer Multi–Rate Traffic, J.Y. Hui, vol. 3, Apr.–Jun., 1990, pp. 127–135.

Int'l Journal of Digital and Analog Communication Systems, Considerations in ATM Switching System Traffic Control, K. Murakami et al, Apr.–Jun., 1990, vol. 3, pp. 137–142.

Int'l Journal of Digital and Analog Communication Systems, A Connection Acceptance Algorithm for ATM Networks Based on Mean and Peak Bit Rates, E. Wallmeier, Apr.–Jun., 1990, vol. 3, pp. 143–153.

Int'l Journal of Digital and Analog Communication Systems, Admission Control over Mixed Traffic in ATM Networks, A. Lombardo et al, Apr.–Jun., 1990, vol. 3, pp. 155–159.

Int'l Journal of Digital and Analog Communication Systems, Dynamic Capacity Management in the BISDN, J. Burgin, vol. 3, Apr.–Jun., 1990, pp. 161–165.

Int'l Journal of Digital and Analog Communication Systems, The 'Leaky Bucket' Policing Method in the ATM (Asynchronous Transfer Mode) Network, G. Niestegge, Apr.–Jun., 1990, vol. 3, pp. 187–197.

Int'l Journal of Digital and Analog Communication Systems, Traffic Characteristics and a Congestion Control Scheme for an ATM Network, M. Hirano et al, vol. 3, Apr.–Jun., 1990, pp. 211–217.

Int'l Journal of Digital and Analog Communications Systems, Priority Cell Discarding for Overload Control in BISDN/ATM Networks: An Analysis Framework, D.W. Petr et al, vol. 3, Apr.–Jun., 1990, pp. 219–227.

Int'l Journal of Digital and Analog Communication Systems, An Architecture for Integrated Networks that Guarantees Quality of Service, A.A. Lazar et al, vol. 3, Apr.–Jun., 1990, pp. 229–238.

Proceedings of the 13th International Teletraffic Congress (ITC), Mixing Time and Loss Priorities in a Single Server Queue, A. Gravey et al, Jun. 1991, pp. 147–152.

IEEE Journal on Selected Areas in Communications, vol. 9, No. 3, Priority Management in ATM Switching Nodes, H. Kroner et al, Apr. 1991, pp. 418–427.

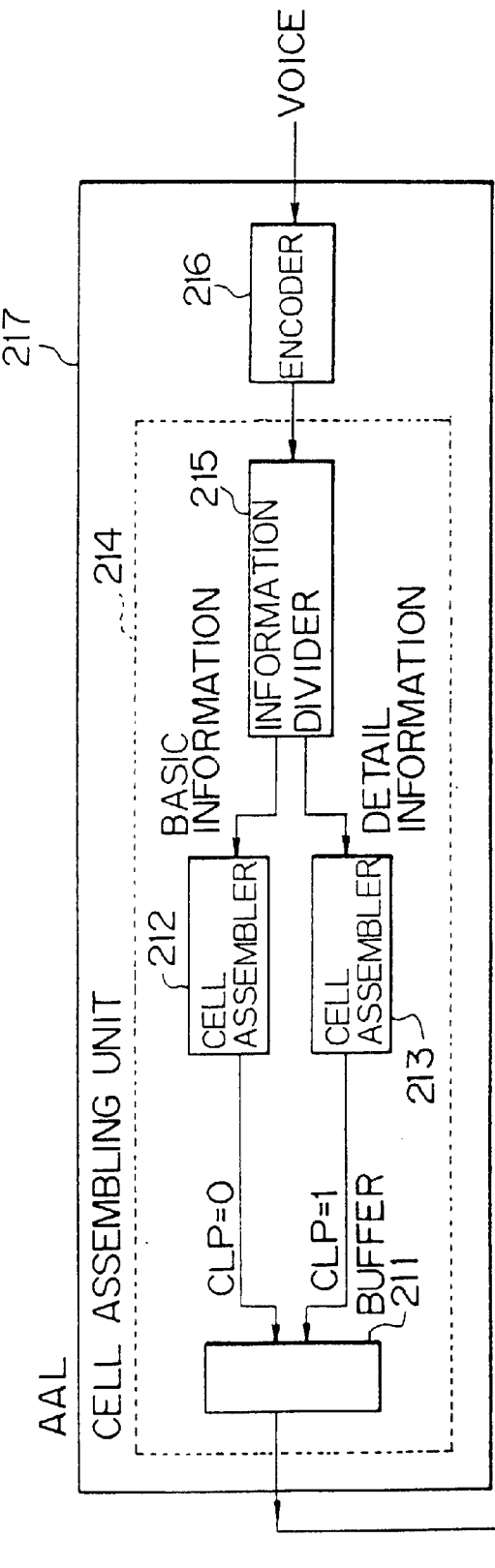

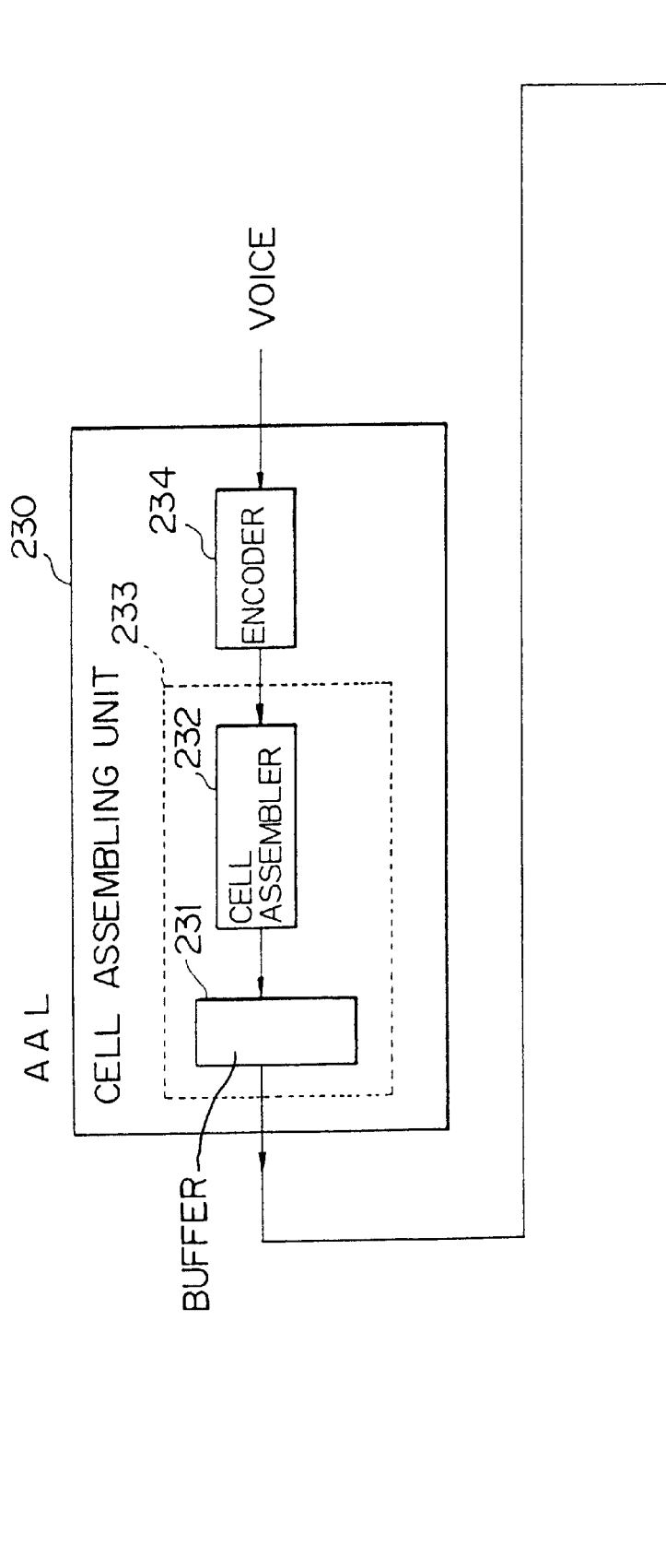

APPARATUS AND METHOD FOR CELL DISCARD

BACKGROUND OF THE INVENTION

1. Field of the Invention

The present invention relates to control of cell discarding that occurs due to congestion, etc., between communication nodes in asynchronous transfer mode (ATM) communication, and more particularly to a cell-discard control apparatus that makes it possible to discard voice cells without degrading voice articulation during voice communication. Furthermore, the invention relates to a cell-discard control apparatus that is also capable of minimizing degradation of image information due to cell discarding.

2. Description of the Prior Art

In recent years, B-ISDN (Broadband Integrated Service Digital Network) has been emerging as the next generation public network, and with the deployment of the B-ISDN, even more flexible broadband communication networks than before are being realized which provide such differing services as voice communications, very high speed file transfer, information communications, communications between LANs, moving images, and even moving image services of high-definition television (HDTV). ATM communication technology that can handle such multimedia is used in the B-ISDN.

A user terminal is connected to a communication node via a user network interface (UNI). Each communication node is connected to other communication nodes via node network interfaces (NNIs) and digital service units (DSUs) for high speed asynchronous transmission of ATM cells. Each communication node contains ATM adaptation layers (AALs) and ATM switches. The AALs perform ATM cell assembly and disassembly between the user terminals and the ATM switches. Data from each user terminal is broken up into a plurality of ATM cells.

The data from the terminal is broken up into cells by the AAL and a communication path is set up by the ATM switch. Using the header data in each ATM cell, the ATM switch performs high speed switching operation by hardware which is a feature of ATM. If communication path congestion is detected by the ATM switch during communication, the ATM switch discards part of the data transmitted from the transmitting user terminal. In this case, the ATM switch checks the CLP (cell loss priority) control bit in the ATM cell header and preferentially discards cells whose CLP value is "1".

For voice cells which generally have a high level of redundancy and are therefore less affected by cell discarding, the CLP is set to "1", whereas for other cells such as data, modem, facsimile data, etc., the CLP is set to "0".

However, communication path congestion usually occurs in bursts, which, in the prior art example, results in discarding voice cells in bursts as they have the higher cell-discard priority (CLP=1). This causes abrupt occurrence of a temporarily silent condition during voice communication or intermittent interruptions of voice communication, greatly degrading articulation of voice communication.

There has also been the problem during transmission of image information that burst loss of cells causes instantaneous disruption of a television or computer display screen or appears as clearly visible noise on the screen.

SUMMARY OF THE INVENTION

In view of the above problems, it is an object of the invention to prevent burst loss of cells such as described above, by setting a voice cell of the higher cell-discard priority at a prescribed interval of time or at an interval of a prescribed number of voice cells or by detecting the voice level and setting voice cells of the higher cell-discard priority in such a way as to avoid assigning the higher cell-discard priority to voice cells where the level changes abruptly, whereas in prior art all voice cells are assigned with the higher cell-discard priority (CLP=1).

It is another object of the invention to ensure minimum transmission quality by dividing voice or image information into basic information containing a vital information part and detail/redundant information containing a detail or redundant information part and by assigning the lower cell-discard priority (CLP=0) to the cells of the basic information and the higher cell-discard priority (CLP=1) to the cells of the detail/redundant information, thereby preventing interruption of voice and minimizing degradation of image information by using the basic information cells (CLP=0) when burst loss of voice cells or image cells has occurred (discarding detail/redundant information cells).

It is a further object of the invention to drastically reduce the number of cells necessary for information transmission, thereby increasing the cell utilization efficiency while preventing occurrence of congestion, the drastic reduction of the number of cells being achieved by multiplexing wherein voice channel information contained in the aforementioned basic information cells and detail/redundant information cells is divided into groups of several channels and each group of channels is carried in the information field of one cell for transmission, or more specifically, voice information of a plurality of channels carried in separate cells but intended for transmission along the same path (the same VPI) is divided into basic information and detail/redundant information cells, each cell carrying information of several channels for transmission.

According to the present invention, there is provided a cell-discard control apparatus for discarding cells of a voice signal in asynchronous transfer mode (ATM) communication in accordance with prescribed priority, comprises: cell assembling means for assembling a voice signal into cells for transmission; memory means containing a pulse count value for setting priority at a prescribed interval of time; counting means for comparing the pulse count value with an external timing pulse count and for outputting a count end signal at the prescribed interval of time; and priority appending means for applying a cell-discard priority appending signal to the cell assembling means in response to the count end signal from the counting means.

The cell-discard control apparatus comprises: cell assembling means for assembling a voice signal into cells and for outputting a timing pulse as each cell is generated; memory means containing a cell count value for setting priority for every prescribed number of cells; counting means for comparing the cell count value with a timing pulse count from the cell assembling means and for outputting a count end signal at a periodic interval equivalent to the prescribed number of cells; and priority appending means for applying a cell-discard priority appending signal to the cell assembling means in response to the count end signal from the counting means.

Furthermore, the cell-discard control apparatus comprises: cell assembling means for assembling a voice signal into cells and for outputting a voice signal of each cell; level detecting means for detecting a voice signal level output from the cell assembling means, outputting the detected signal level and for temporarily holding said signal level;

comparing means for comparing the detected signal level output from the level detecting means with a previous signal level temporarily being held in the level detecting means; and priority appending means for applying a cell-discard priority appending signal to the cell assembling means when a level comparison output from the comparing means is below a prescribed level.

According to the present invention, there is provided a cell-discard control apparatus for discarding cells of a voice/image signal in asynchronous transfer mode (ATM) communication in accordance with prescribed priority, comprises: encoding means for encoding a voice signal and/or image information in accordance with a prescribed coding scheme; information dividing means for dividing the data encoded by the encoding means into basic information data consisting of a vital information part of the data and detail information data consisting of a detail or redundant information part as distinguished from the vital information part; basic information cell assembling means for assembling the basic information data into basic information cells and for setting their CLP bit to "0"; detail information cell assembling means for assembling the detail information data into detail information cells and for setting their CLP bit to "1"; and cell output means for outputting the basic information cells supplied from the basic information cell assembling means and the detail information cells supplied from the detail information cell assembling means and for preferentially discarding the detail information cells in the event of congestion.

The invention also provides a cell-discard control apparatus which further comprises, basic information multiplexing means for multiplexing information carried in the basic information cells (CLP=0) of a plurality of channels output from the basic information cell assembling means into a basic information multiplexed cell for transmission; and detail information multiplexing means for multiplexing information carried in the detail information cells (CLP=1) of the plurality of channels output from the detail information cell assembling means into a detail information multiplexed cell for transmission, and which, instead of the cell output means, includes cell output means for outputting the basic information multiplexed cell supplied from the basic information multiplexing means and the detail information multiplexed cell supplied from the detail information multiplexing means and for preferentially discarding the detail information multiplexed cell in the event of congestion.

BRIEF DESCRIPTION OF THE DRAWING

The present invention will be more clearly understood from the description as set forth below with reference to the accompanying drawings.

FIGS. 22A and 22B are block diagram illustrating an embodiment (2) of the cell-discard control apparatus of the invention.

FIGS. 23A and 23B are block diagram illustrating an embodiment (3) of the cell-discard control apparatus of the invention.

DESCRIPTION OF THE PREFERRED EMBODIMENTS

Figure 1:
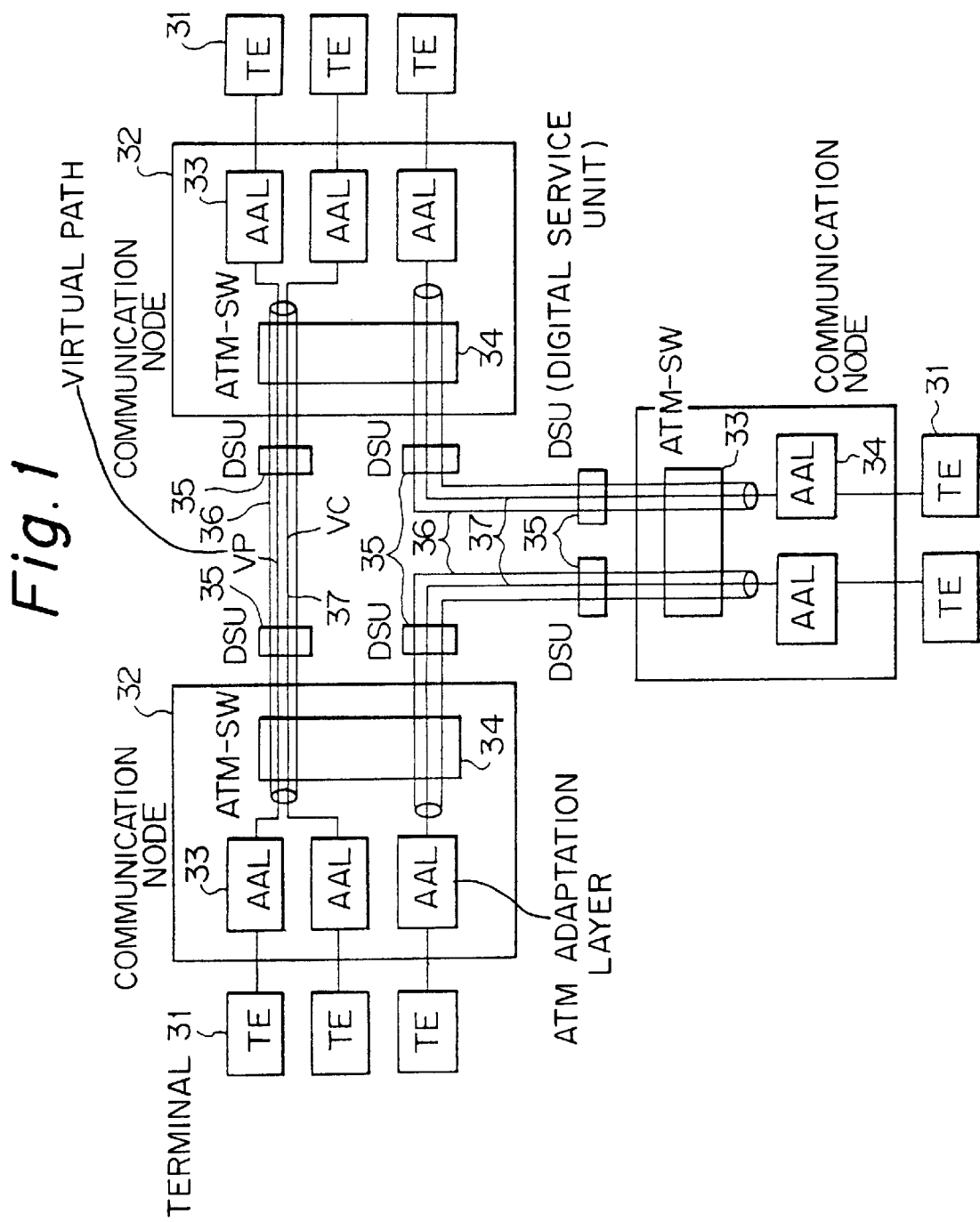
FIG. 1 is a diagram illustrating an example of an ATM communication network.
Figure 2:
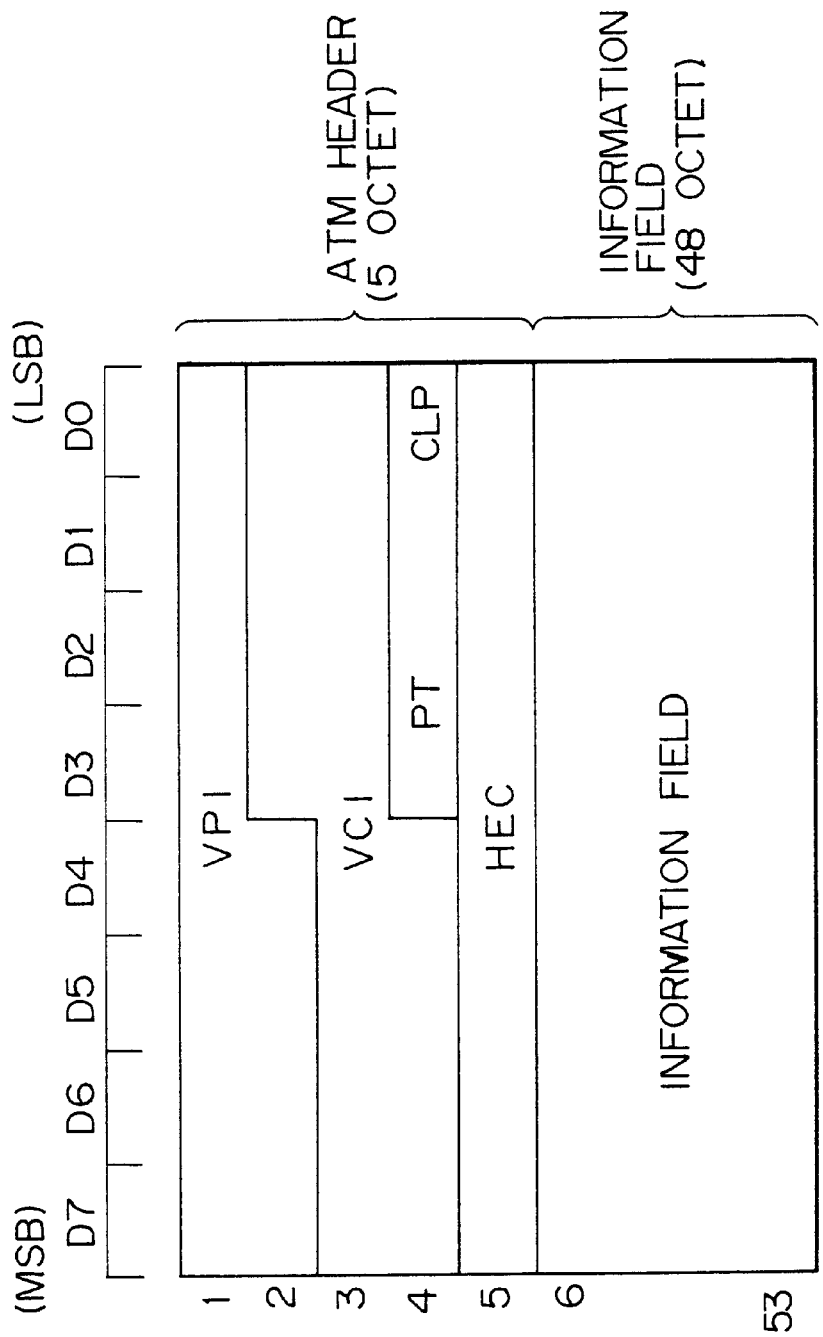
FIG. 2 is a diagram showing a basic format of an ATM cell.
Figure 3:
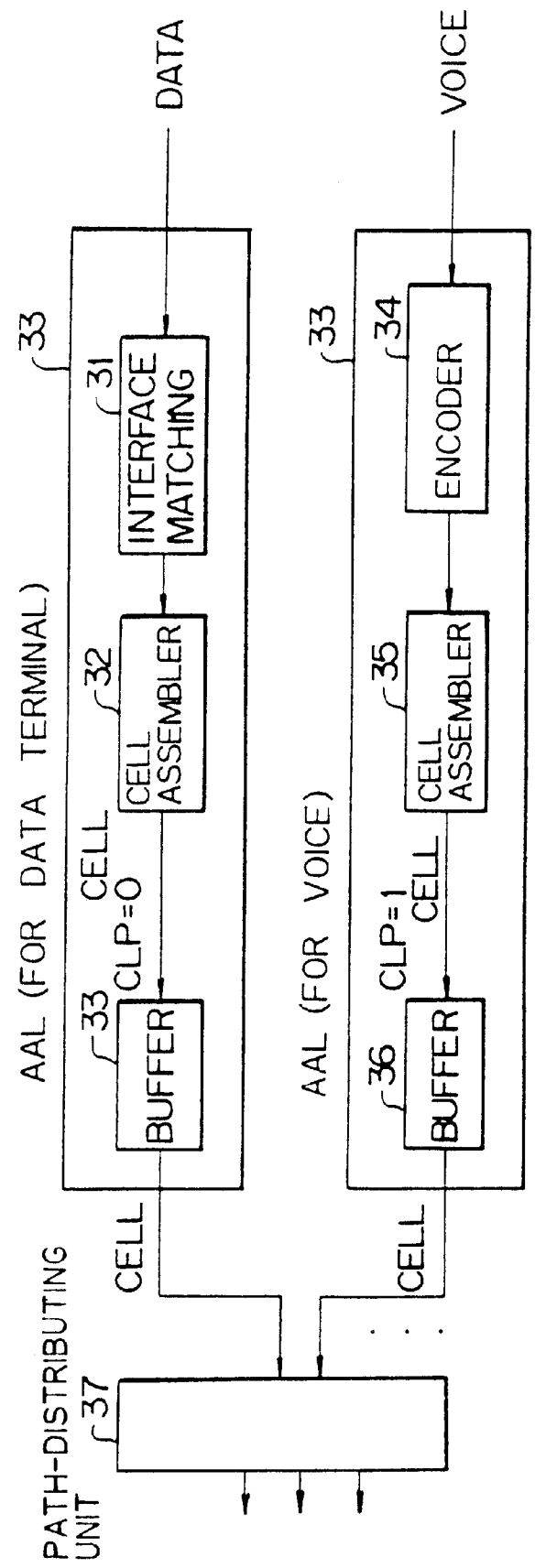
FIG. 3 is a block diagram illustrating a prior art example of data and voice cell assembly in an AAL.

Before describing the preferred embodiments according to the present invention, examples of the related art are provided with reference to accompanying drawings (FIG. 1, FIG. 2 and FIG. 3).

FIG. 1 is a schematic diagram illustrating how communications are performed between nodes in the B-ISDN as described above.

In FIG. 1, a user terminal 31 is connected to a communication node 32 via a user network interface (UNI). Each communication node is connected to other communication nodes via node network interfaces (NNIS) and digital service units (DSUs) 35 for high speed asynchronous transmission of ATM cells. Each communication node 32 contains ATM adaptation layers (AALs) 33 and ATM switches 34. The AALs 33 perform ATM cell assembly and disassembly between the user terminals 31 and the ATM switches 34. Data from each user terminal 31 is broken up into a plurality of ATM cells.

As shown in FIG. 2, each ATM cell consists of 53 octets. The first five octets represent the ATM header that identifies the destination, and the remaining 48 octets constitute the information field that carries voice, data, etc., sent from the source terminal. The ATM header contains a virtual path identifier (VPI) that specifies a communication path, a virtual channel identifier (VCI) that specifies a channel to be used in the specified communication path, control bits for PT and CLP, and a CRC calculation value for header error control (HEC). The information field carries information from the terminal, such as voice, data, etc., that has been divided into cells of 48 octets. If the information does not fill up to 48 octets, any remainder is filled with a blank.

Referring back to FIG. 1, the data from the terminal 31 is broken up into cells by the AAL 33 and a communication path is set up by the ATM switch 34. Using the header data in each ATM cell, the ATM switch 34 performs high speed switching operation by hardware which is a feature of ATM. FIG. 1 illustrates how the user terminals 31 connected to the respective communication nodes 32 communicate with each other over communication paths, i.e., virtual paths (VPs) 36 and virtual channels (VCs) 37 specified therein. If communication path congestion is detected by the ATM switch 34 during communication, the ATM switch 34 discards part of the data transmitted from the transmitting user terminal 34. In this case, the ATM switch 34 checks the CLP (cell loss priority) control bit in the ATM cell format (FIG. 2) and preferentially discards cells whose CLP value is "1".

FIG. 3 is a block diagram illustrating a prior art example of data and voice cell assembly.

In FIG. 3, a data signal is input to the AAL 33 via an interface matching section 31 at layer 1, etc. of the UNI, and is assembled by a cell assembler 32 into data cells of the ATM format shown in FIG. 2. In this process of cell assembly, the CLP bit in each data cell is set to "0" which indicates the lower cell-discard priority. Each data cell is fed via a buffer 33 to a path distributor 37 of the ATM switch 34. The path distributor 37 sends out the data cell onto the path specified by the VPI in the ATM cell header. On the other hand, a voice signal is input to an encoder 34 of the AAL 33 where the signal is encoded and compressed in accordance with &L-law, for example. The encoded data is assembled by a cell assembler 35, the same component as the cell assembler 32, into voice cells. In the case of voice cells, the CLP bit is set to "1" which indicates the higher cell-discard priority. The process thereafter is the same as described above. For voice cells which generally have a high level of redundancy and are therefore less affected by cell discarding, the CLP is set to "1", whereas for other cells such as data, modem, facsimile data, etc., the CLP is set to "0".

Figure 4:
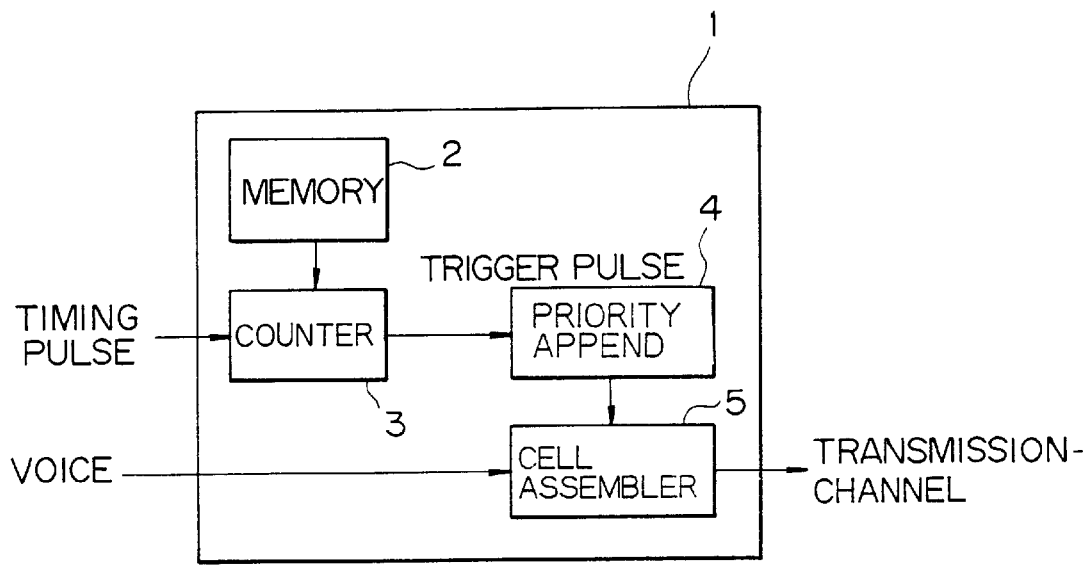
FIG. 4 is a block diagram showing a basic configuration (1) of a cell-discard control apparatus according to the invention.
Figure 5:
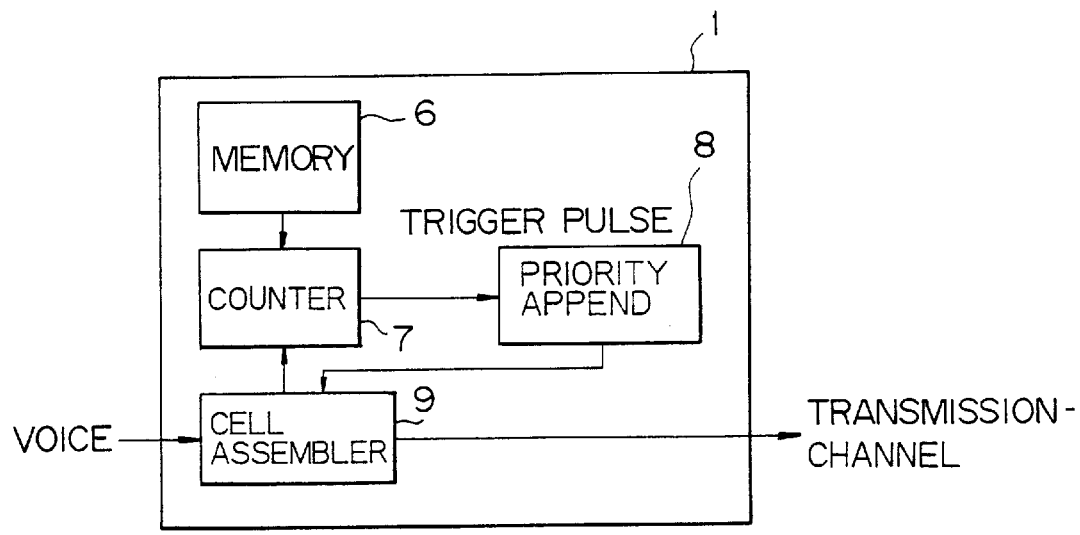
FIG. 5 is a block diagram showing a basic configuration (2) of a cell-discard control apparatus according to the invention.

FIG. 4 and 5 are block diagrams showing a basic configuration (1) and (2) of a cell-discard control apparatus according to the invention.

In FIG. 4, the pulse count value stored in the memory unit 2 is loaded into the counting unit 3. With the loaded count length as the initial value, the counting unit 3 is incremented or decremented by each external timing pulse, and outputs a trigger signal, such as a carrier signal, when the final count is reached. The priority appending unit 4 is activated by the trigger signal and sets the CLP bit of the ATM cell being generated in the cell assembling unit 5 to "1". Therefore, when external system timing, for example, is used as the timing pulse, voice cells with their cell-discard priority CLP set to "1" can be generated at prescribed intervals of time synchronized with that timing. This allows voice cells to be discarded randomly in bursty cell-loss situations caused by congestion, etc. Furthermore, by changing the pulse count value in the memory unit 2 according to the degree of congestion, etc., voice cells can be discarded at desired intervals of time, to ensure cell-discard randomness that further matches the situation.

While the apparatus of FIG. 4 is designed to generate voice cells of the higher cell-discard priority at prescribed intervals of time, the apparatus of FIG. 5 is adapted to generate voice cells of CLP=1 at intervals of a prescribed number of voice cells. The configuration of FIG. 5 is fundamentally the same as that of FIG. 4, the only difference being that the external timing pulse in FIG. 4 is replaced by a signal indicating the generation of one cell in the cell assembling unit 9 as the count signal applied to the counting unit 7. This configuration prevents voice cells from being discarded in sequential manner in bursty cell-loss situations, to ensure cell-discard randomness, as in FIG. 4.

Figure 6:
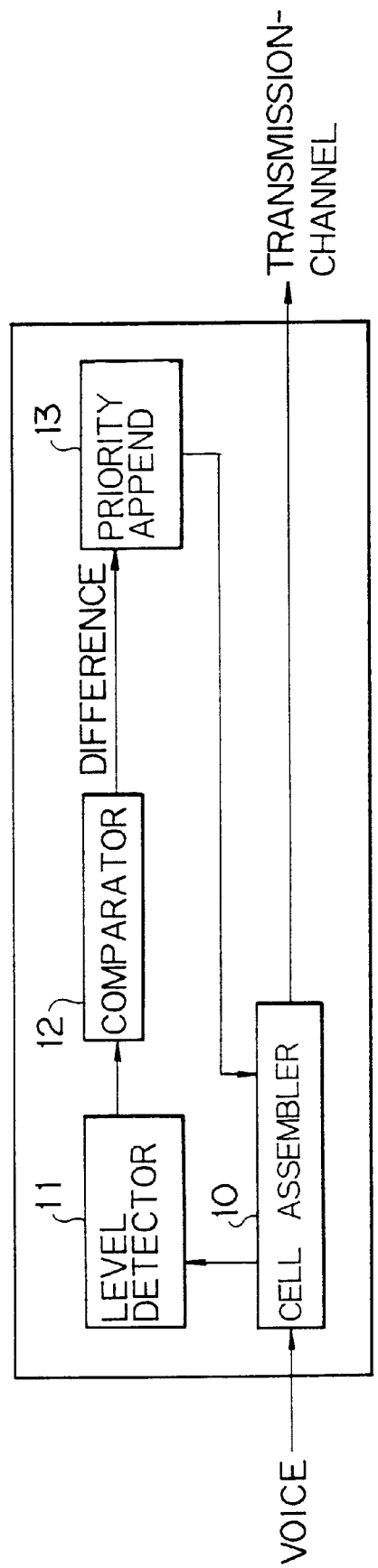
FIG. 6 is a block diagram showing a basic configuration (3) of a cell-discard control apparatus according to the invention.

FIG. 6 is a block diagram showing a basic configuration (3) of a cell-discard control apparatus according to the invention.

The configuration of FIG. 6 is intended to ensure communication of higher quality than that of FIG. 4 or 5 in bursty cell-loss situations. The cell assembling unit 10 outputs a voice signal along with a cell signal, and the level detecting unit 11 detects the level of the voice signal and supplies it to the comparing unit 12 at the next stage while temporarily holding the voice signal level (for the duration of time equal to the time that the cell assembling unit 10 takes to generate one cell). The comparing unit 12 compares the voice signal level supplied from the level detecting unit 11 with the temporarily held signal level of the immediately preceding cell, and when the level difference is smaller than a prescribed value, instructs the priority appending unit 13 at the next stage to set the CLP to "1". This instruction is not given when the level difference is greater than the prescribed value. A level difference smaller than the prescribed value means that the level difference between adjacent cells is so small that discarding one or other of the cells would not cause any audible difference. On the other hand, when the level difference is greater than the prescribed value, discarding one or other of the cells would interrupt the continuity of the voice and would cause instantaneous noise during communication. The priority appending unit 13 works to set the CLP in the voice cell being generated in the cell assembling unit 10 to "1". The above description has dealt with comparison with the immediately preceding cell, but it will be appreciated that the cell to be compared with need not necessarily be the immediately preceding cell but that the comparison of levels may be made with a voice cell preceding by several cells or with voice cells before and after the cell of interest.

Figure 7:
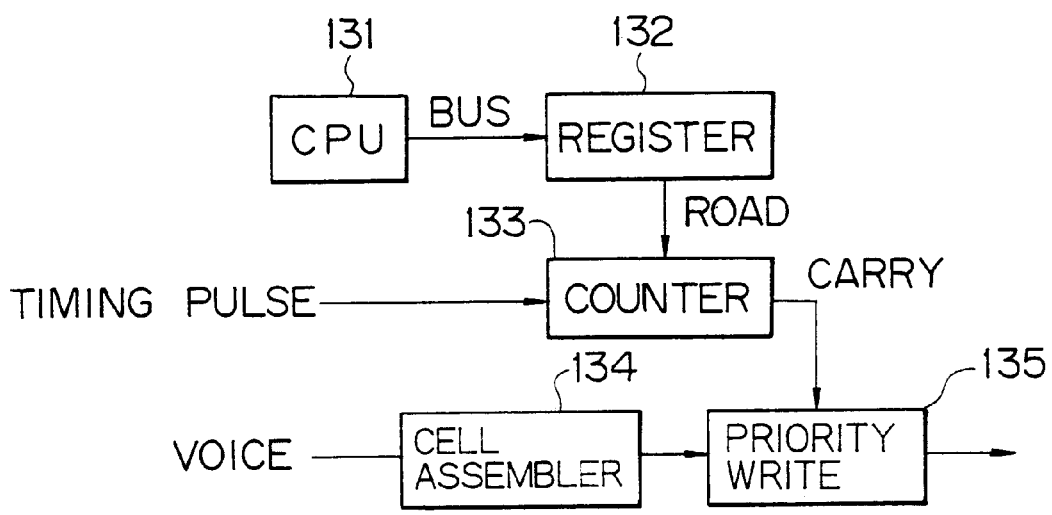
FIG. 7 is a block diagram illustrating one embodiment of the invention shown in FIG. 4.

FIG. 7 illustrates one embodiment of the invention implementing the configuration of FIG. 4. In comparison with FIG. 4, the register 132, counter circuit 133, cell assembling circuit 134, and priority writing circuit 135 shown in FIG. 7 respectively correspond to the memory unit 1, counting unit 3, cell assembling unit 5, and priority appending unit 4 shown in FIG. 4. In FIG. 7, the final cell output appears from the priority writing circuit 135, but this arrangement is the result of the circuit implementation and does not constitute an essential difference from the configuration of FIG. 4. In FIG. 7, a microprocessor (CPU) 131 is provided which sets a pulse count number in the register 132 via an internal bus, etc. As the timing pulse signal, a voice sampling pulse signal (8 kHz or 64 kHz) is used, for example.

Figure 8:
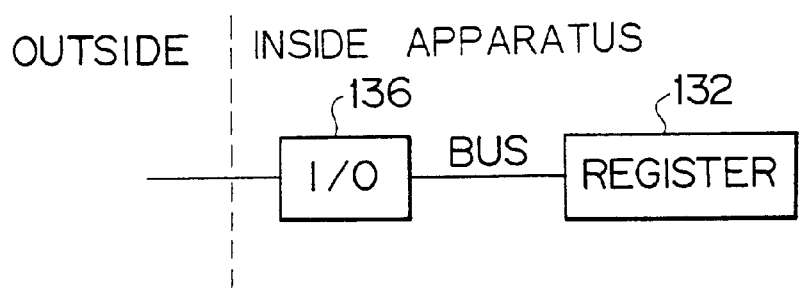
FIG. 8 is a block diagram illustrating an alternative example of register setting of FIG. 7.

FIG. 8 shows an example in which the count value is set in the register 132 from the outside via a control bus or communication line, for example, instead of using the microprocessor 131 shown in FIG. 7. In this example, a parallel I/O device 136 or an RS-232C serial communication controller, for example, is provided within the apparatus, for interfacing with the external bus or the communication line, via which the pulse count value is written to the register 132.

Figure 9:
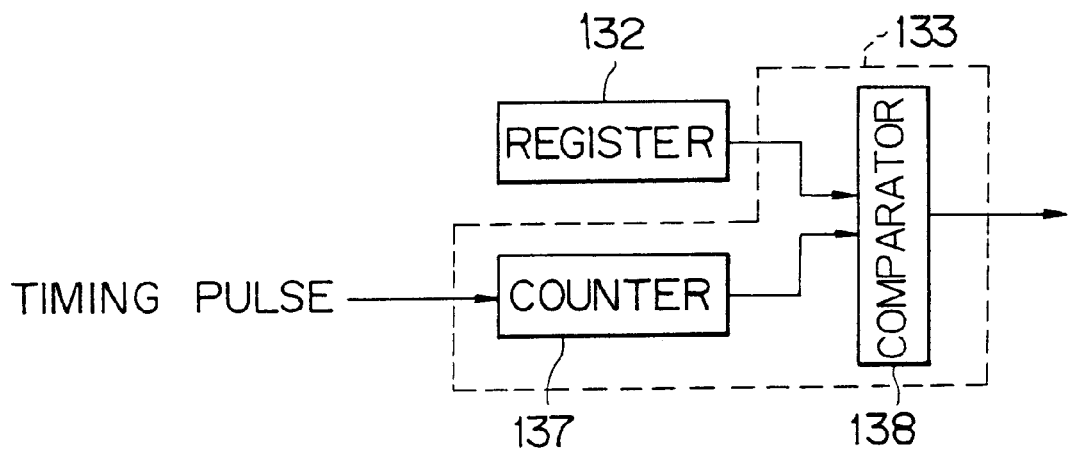
FIG. 9 is a block diagram illustrating an example of a counter circuit shown in FIG. 7.

FIG. 9 shows an example of the counter circuit of FIG. 7. Usually, the pulse count value (initial value) is loaded from the register 132 into the counter circuit 133, at the start or at the end of counting, to initialize the counter. The counter circuit 133 increments or decrements the initial value each time the external timing pulse is input, and outputs a carry signal when the final count is reached. On the other hand, in the counter circuit 133 of FIG. 9, the counter 137 is either cleared to zero initially and then incremented with each external timing pulse or set to all 1s initially and then decremented with each external timing pulse, and a carry signal is output when the counter value being input to a comparator 138 reaches the set value of the register 132.

Figure 10:
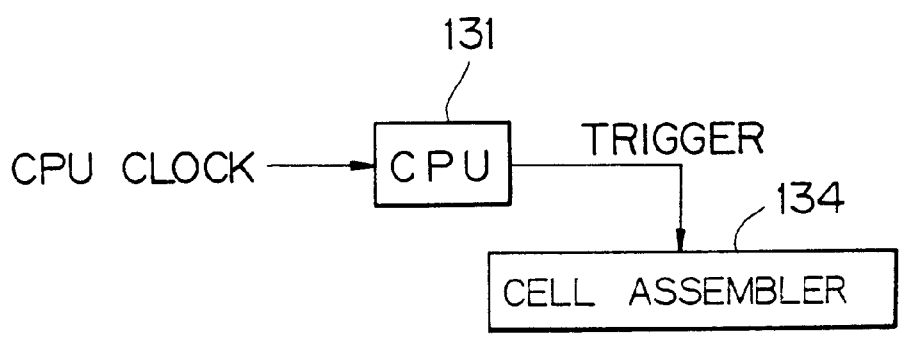
FIG. 10 is a block diagram illustrating an example for implementing priority writing in software.

While the configuration of FIG. 7 uses hardware, such as the register 132 and counter circuit 133, to generate the priority writing frequency, the example shown in FIG. 10 implements these units using software of a microcomputer 131. Therefore, in this example, the microcomputer 131 is the only hardware used, and furthermore, the external timing pulse signal shown in FIG. 7 is not needed since the timing is derived from the internal clock of the microcomputer. In this case, the cell-discard priority writing operation is synchronized with the internal clock of the microcomputer.

Figure 11:
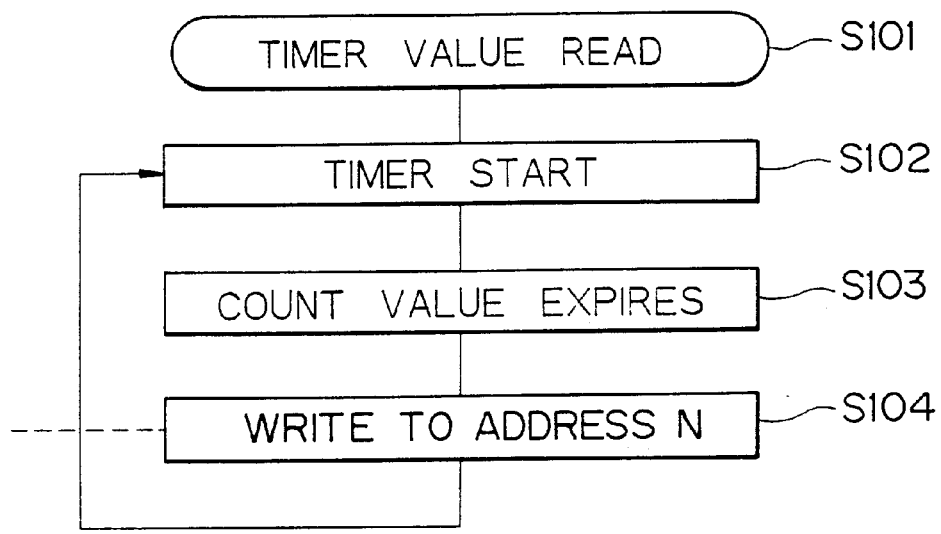
FIG. 11 is a flowchart illustrating an example of a priority writing sequence shown in FIG. 10.

FIG. 11 shows an example of the software of the microcomputer 131. In this example, the register 132 and counter circuit 133 (shown in FIG. 7) are replaced by a register and memory internal to the microcomputer 131 and a hard timer or soft timer internal to the microprocessor. In step S101, the initial value (corresponding to the pulse count number) for the timer is read from the internal register or memory. In step S102, the timer in which the initial value has been set is started, and in step S103, the expiration of the timer value triggers a timer interrupt, etc. In step S104, a prescribed bit on the output port is turned on by servicing the interrupt, etc. (the bit is software assigned to a bit at address N). Thereafter, the process returns to step S102 to repeat the above sequence of steps.

Figure 12:
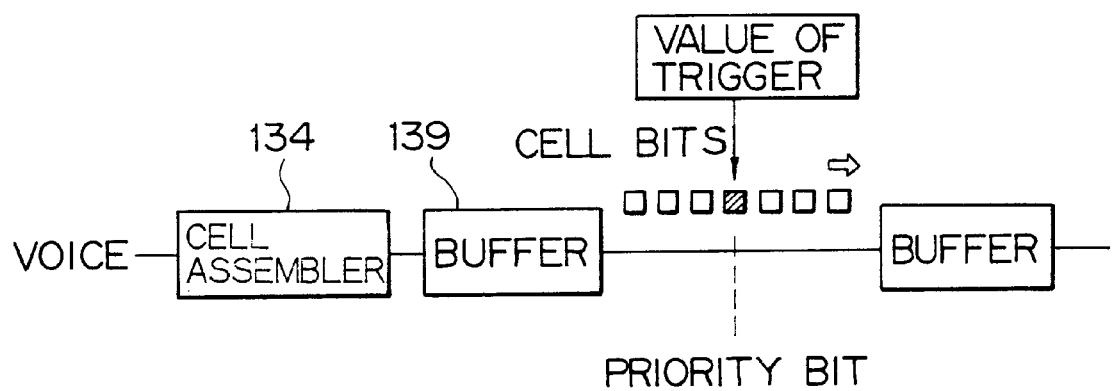
FIG. 12 is a schematic diagram illustrating an example of cell-discard priority writing.

FIG. 12 illustrates an example of a cell-discard priority write operation. Each voice cell generated by the cell assembling circuit 134 is temporarily stored in a buffer 139 before it is placed onto the communication path. The buffer 139 may be internal or external to the cell assembling circuit 134. Each time the cell-discard priority write signal is generated after the prescribed period of time, "1" is written to the CLP in the ATM header (FIG. 2) of the voice cell stored in the register 139 at that time. After that, when the time comes to send out the voice cell, the voice cell is output from the buffer 139 as a serial signal with the ATM header leading the bit train as shown in FIG. 9. The bit blacked out in FIG. 12 shows the CLP bit of the ATM header. In this example, the CLP bit is set to "1" as described above. As an alternative, a gate circuit or the like may be provided to set the CLP bit to "1" in synchronism with the shift-out timing of the CLP bit when the serial signal is output.

Figure 13:
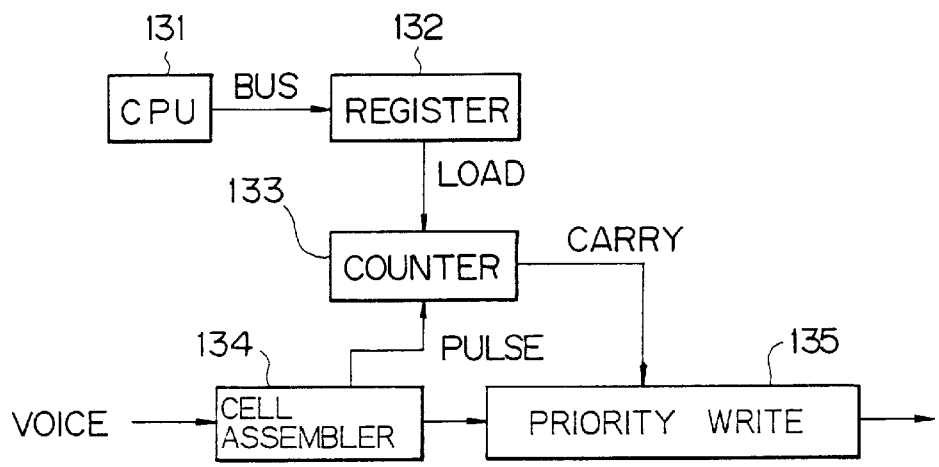
FIG. 13 is a block diagram illustrating one embodiment of the invention shown in FIG. 5.

FIG. 13 illustrates one embodiment of the invention implementing the configuration of FIG. 5. In comparison with FIG. 5, the register 132, counter circuit 133, cell assembling circuit 134, and priority writing circuit 135 shown in FIG. 13 respectively correspond to the memory unit 6, counting unit 7, cell assembling unit 9, and priority appending unit 8 shown in FIG. 5. In the configuration of FIG. 5, the priority write signal from the priority appending unit 9 is applied to the assembling unit 9, but this does not constitute an essential part of the invention, as described in connection with FIG. 7. The same parts as those shown in FIG. 7 are designed by the same reference numerals, and explanatory description of such parts is omitted herein. The configuration of FIG. 13 is different from that of FIG. 7 in that the cell assembling circuit 134 outputs a pulse to the counter circuit 133 each time one voice cell is generated. The counter circuit 133, therefore, counts the pulses output from the cell assembling circuit 134, instead of the external timing pulses shown in FIG. 7. As a result, in this example, the discard priority is written for every prescribed number of voice cells.

Figure 14:
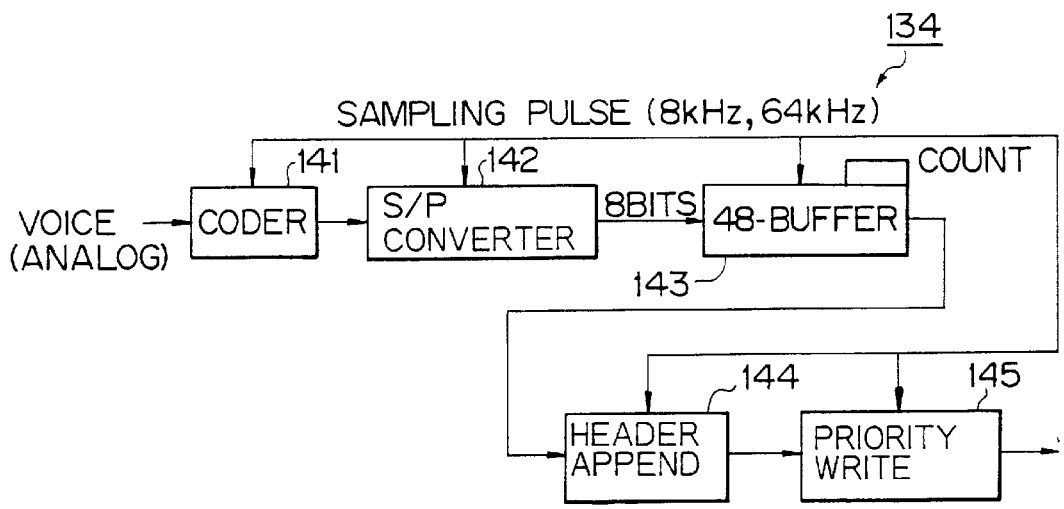
FIG. 14 is a detail block diagram illustrating a configuration of a cell assembling circuit.

FIG. 14 is a detail block diagram showing an example of the configuration of the cell assembling circuit 134 shown in FIG. 13. An analog voice signal is converted by an encoder (CODER) 141 into a serial digital signal which is further converted by a serial/parallel converter (S/P) at the next stage into an eight-bit parallel signal. If the input voice signal is already digitized, the encoder 141 is not needed. Furthermore, if the digital voice signal is input in parallel, the serial/parallel converter 142 is not needed. The parallel digital signal is temporarily stored in a 48-buffer 143 having a capacity of 48 bytes. The 48-buffer 143 is used to generate the information field (48-octet) described in connection with FIG. 2, and buffers the signal up to 48 bytes. When the buffer becomes full, the contents which constitute the information field are output to a header appending circuit 144 at the next stage. At the same time, the cell assembling circuit 134 outputs the above-mentioned pulse to the counter circuit 133 (shown in FIG. 13). The header appending circuit 144 appends a header (FIG. 2) to the information field, and finally, the cell-discard priority is written to the CLP in the header by a priority writing circuit 145 (if it includes the same function as the circuit 135 of FIG. 13).

Figure 15:
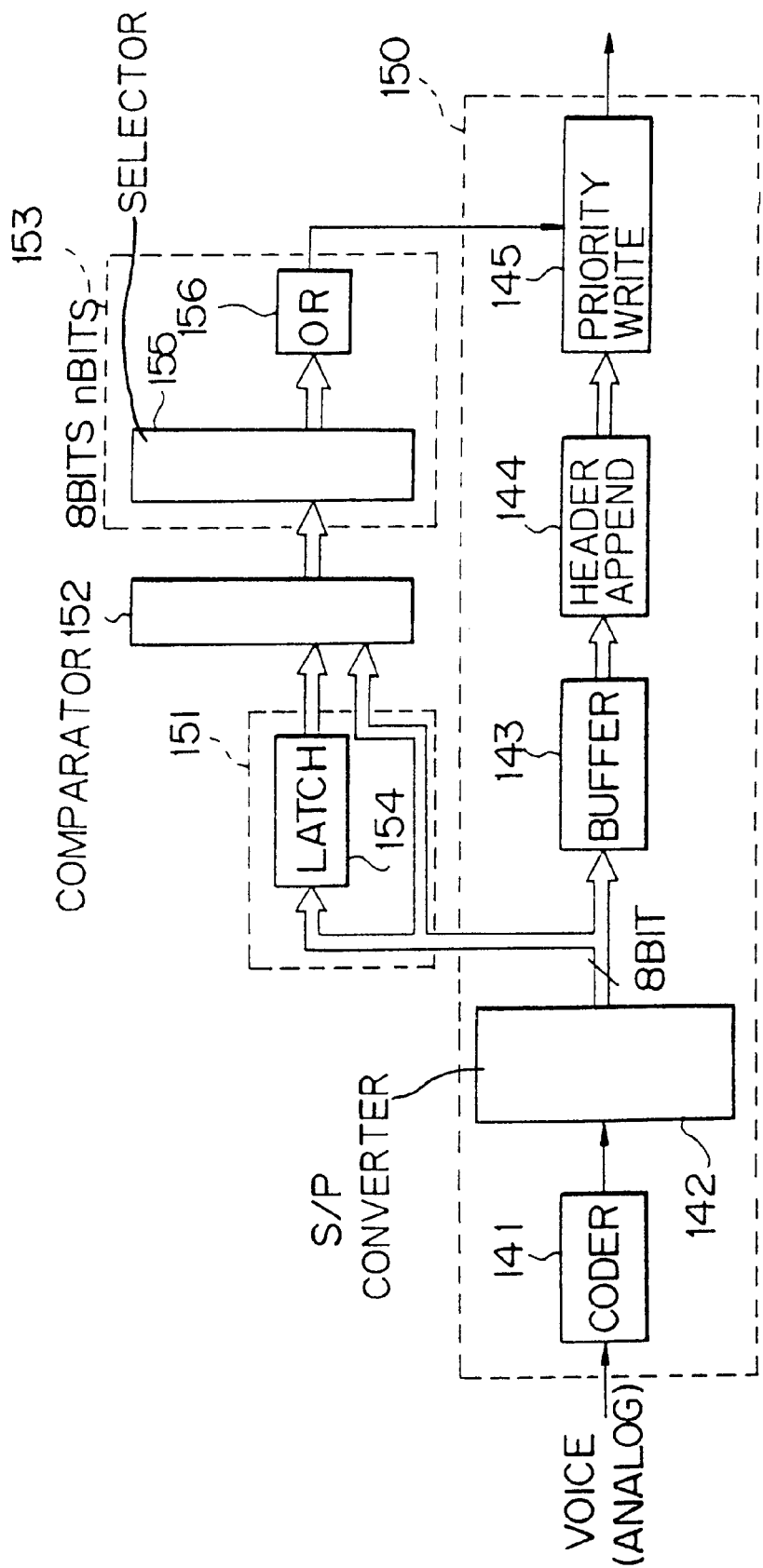
FIG. 15 is a block diagram illustrating one embodiment of the invention shown in FIG. 6.

FIG. 15 illustrates one embodiment of the invention implementing the configuration of FIG. 6. In comparison with FIG. 6, the cell assembling circuit 150, level detecting circuit 151, comparing circuit 152, and priority deciding circuit 153 shown in FIG. 15 respectively correspond to the cell assembling unit 10, level detecting unit 11, comparing unit 12, and priority appending unit 13 shown in FIG. 6. The same parts as shown in FIG. 14 are designated by the same reference numerals, and explanatory description of such parts is omitted herein.

In FIG. 15, the eight-bit parallel data representing the voice signal level at one sampling point is input to the level detecting circuit 151 from the serial/parallel converter 142. The input data is held in an internal latch circuit 154 for one sampling period (for example, 125 μs in the case of 8 kHz sampling). Thus, the level detecting unit 151 produces a through output of the input signal as well as an output representing the signal level delayed by one sampling period by the latch circuit 154, and these two signal levels are compared in the comparing circuit 152 to determine the difference between the two levels. The comparing circuit 152 consists of a bit-by-bit exclusive-OR circuit or subtractor, etc. In the priority deciding circuit 153, a selecting circuit 155 selects the high-order n bits from the eight-bit comparison signal, and the result is fed to an OR circuit 156 to obtain a decision.

Suppose, for example, an exclusive-OR circuit is used as the comparing circuit 152. When the corresponding bits between a certain sampling point and the immediately preceding sampling point are equal (no level difference), a "0" is output. Conversely, when they are different (a level difference is detected), a "1" is output. In the process of selecting the high-order n bits by the selecting circuit 155 and processing them by the OR circuit, the level difference between the two signals is judged to a prescribed precision; the precision of the level difference judgement increases with increasing number of n bits, which means that when the number of n bits is small, only rough judgement is possible.

Figure 16:
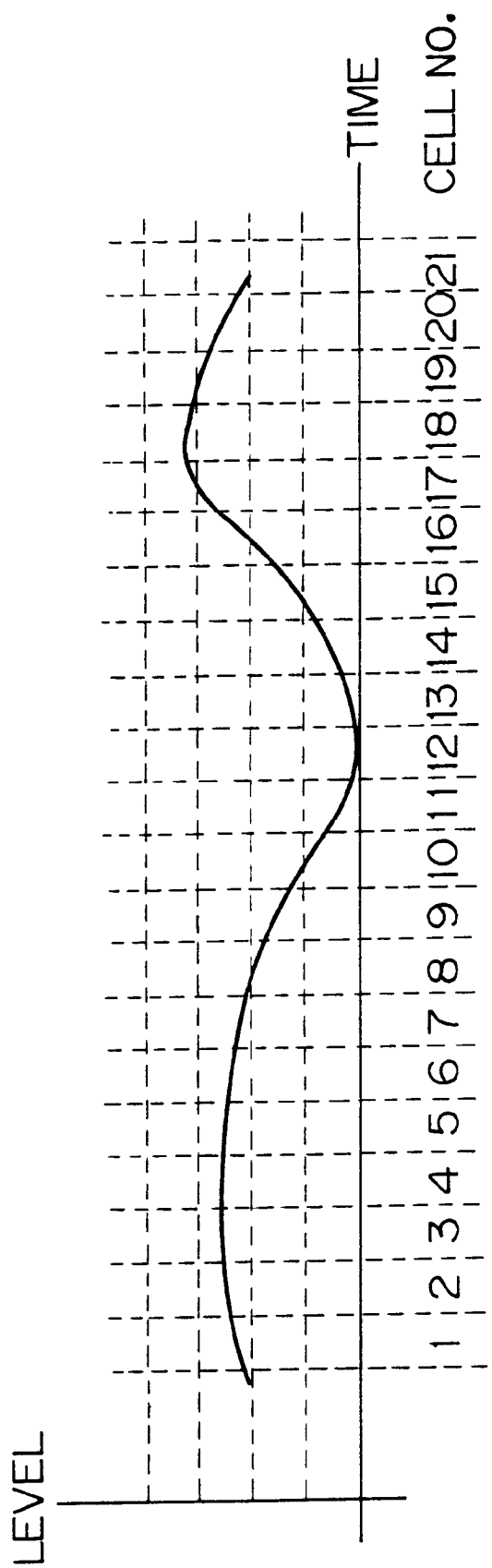
FIG. 16 is a waveform diagram illustrating an example of a voice signal waveform.

FIG. 16 is a diagram demonstrating the above operation in a specific example using a voice signal waveform. For example, the signals of cells 3, 4, and 5 in the diagram exhibit only small level differences between them, so that the digital signal outputs of the cells after conversion by the serial/parallel converter 142 are different from each other only in the lower bits. In this case, the high-order n bits selected by the selecting circuit 155 are all 0s, as a result of which the OR circuit 153 outputs a "0", and the cell discard signal is not output. On the other hand, the level difference between cells 11, 12, and 13 is large, which means that mismatching bits (logical 1) are detected in the high-order bits. As a result, the OR circuit 153 outputs a "1", and the cell discard signal is output.

Figure 17:
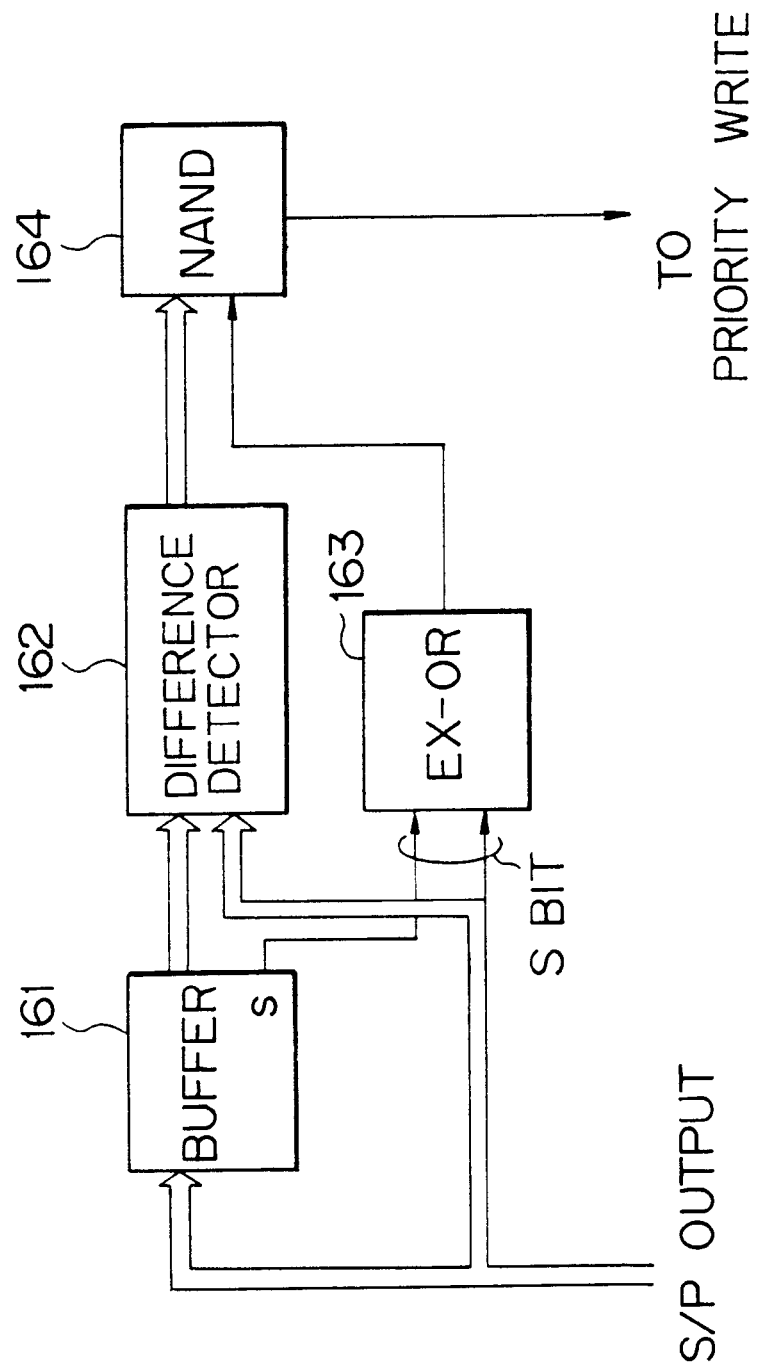
FIG. 17 is a block diagram illustrating an alternative circuit configuration of a level difference detecting section of FIG. 15.

FIG. 17 shows an alternative example of the level detecting and its associated circuits shown in the upper half section of FIG. 15. A buffer circuit 161 consists of several D-type latches connected in parallel so that a comparison can be made with the signal level several sampling periods before. This arrangement is contrasted with the configuration of FIG. 15 in which a comparison is made with the signal level one sampling period before. A difference detecting circuit 162 is the same as the comparing circuit 152 of FIG. 15. An exclusive-OR circuit 163 compares the polarity bit (S bit) of the current signal with that of the signal several sampling periods before. The exclusive-OR circuit 163 outputs a "0" when both S bits have the same polarity, and a "1" when they are different. When the S bits are different, the waveform of FIG. 16 is at a crest or trough. Therefore, in this example, when the outputs of the difference detecting circuit 162 and the exclusive-OR circuit 163 are both "1", that is, when the level difference is greater than a prescribed value and the polarity of the waveform changes (at a crest or trough), a NAND circuit 164 at the following stage outputs a "0", setting the CLP bit to "0" to prevent cell discarding in order to retain the waveform information.

Figure 18:
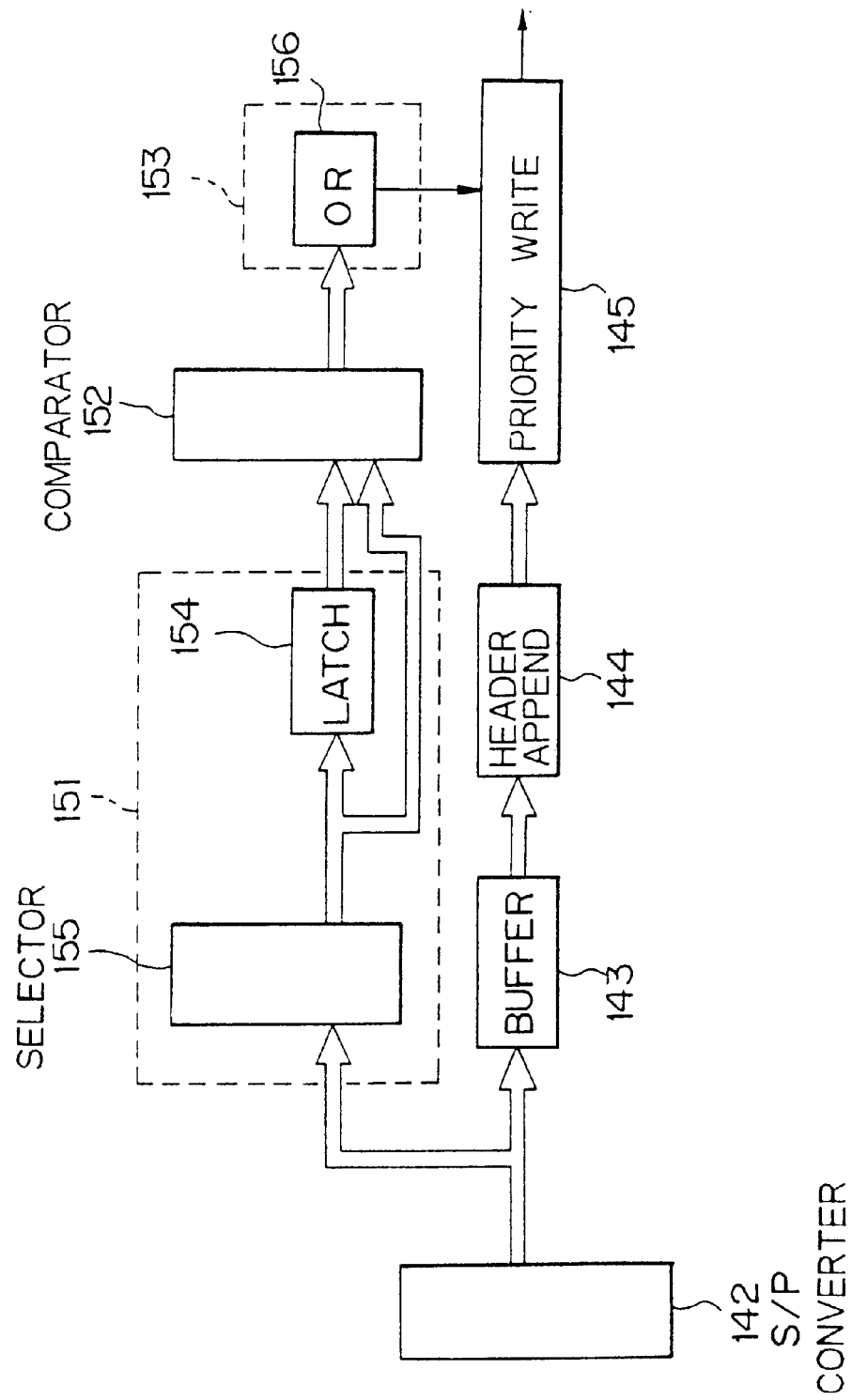
FIG. 18 is a block diagram illustrating an alternative configuration of FIG. 15.

In the configuration shown in FIG. 18, the selecting circuit 155 shown in FIG. 15 is contained in the level detecting circuit 151 at the preceding stage so that the level difference only for the high-order n bits of the signal is examined at the level detection and later stages. This arrangement allows the latch circuit 154, comparing circuit 153, etc., at later stages to be constructed to handle only the n bits, and therefore, has the advantage that the hardware construction is simpler than the circuit of FIG. 15.

Figure 19:
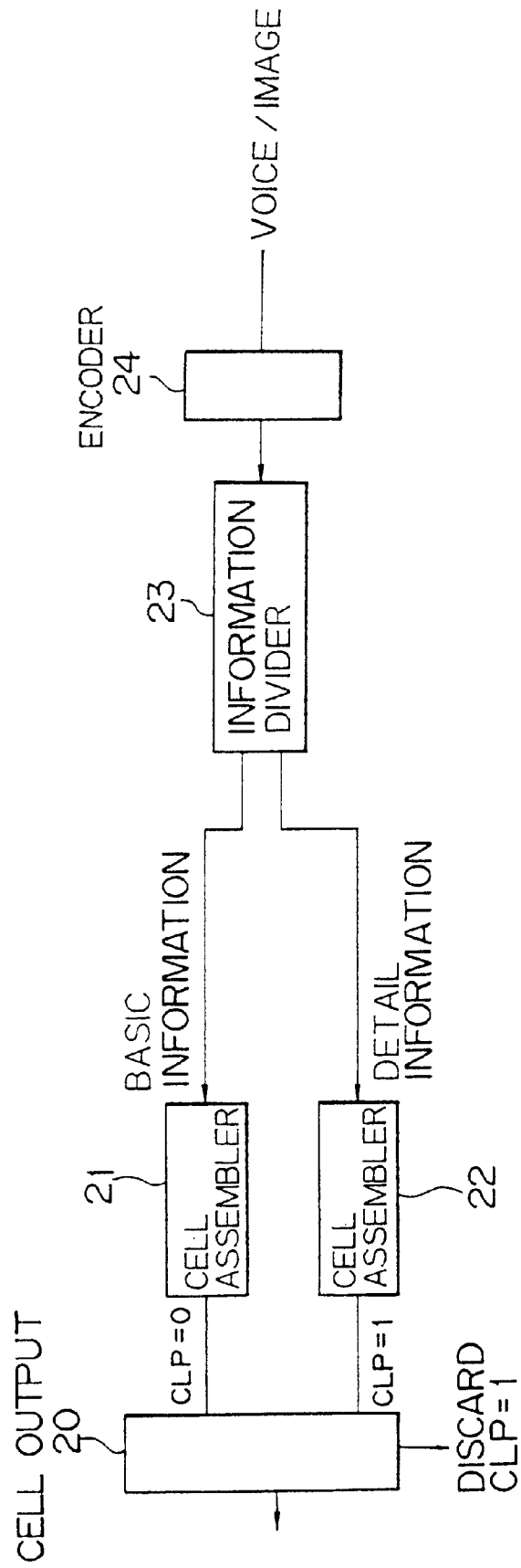
FIG. 19 is a block diagram showing a basic configuration (4) of a cell-discard control apparatus according to the invention.

FIG. 19 is a block diagram showing a basic configuration (4) of a cell-discard control apparatus according to the invention.

Figure 20:
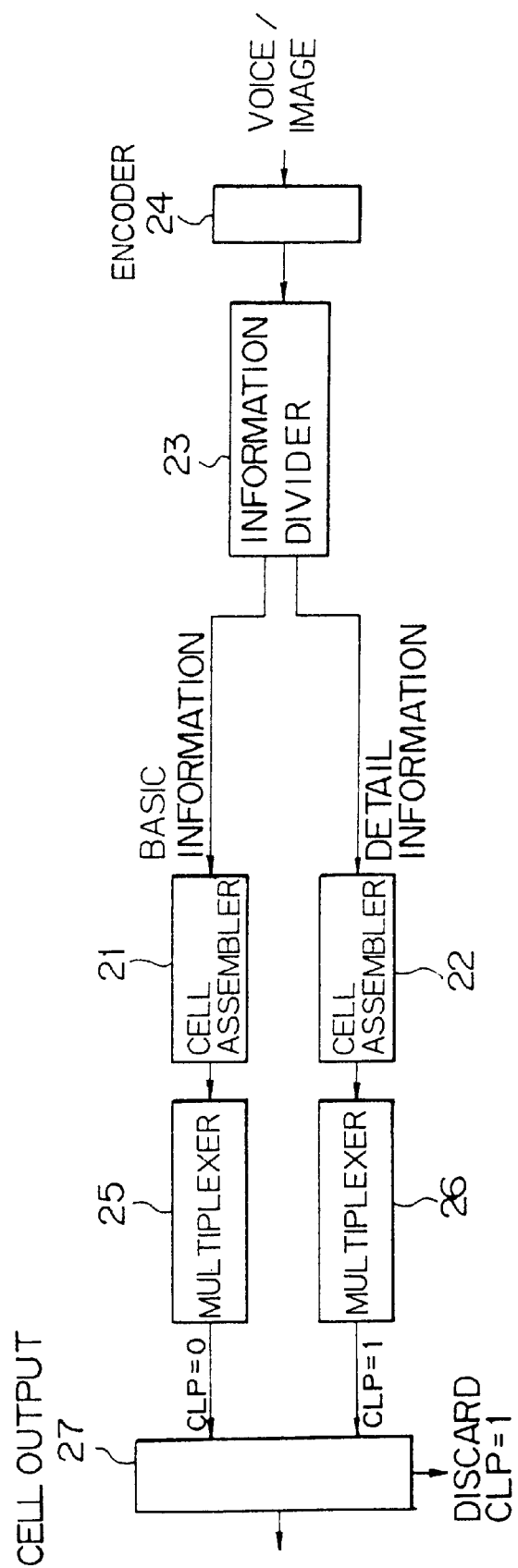
FIG. 20 is a block diagram showing a basic configuration (5) of a cell-discard control apparatus according to the invention.

FIG. 20 is a block diagram showing a basic configuration (5).

The encoding unit 24 in FIGS. 19 and 20 converts an analog voice signal into eight-bit digital data in accordance with $\mu$-law, for example. The information dividing unit 23 divides the eight-bit data into the high-order four bits, i.e. a polarity code of one bit and a segment code of three bits representing a polygonal line compress/decompress characteristic of $\mu$-255, as basic information representing the level of the voice signal, and the low-order four bits, representing the quantization position within the segment indicated by the segment code, as detail information. In the cell assembling unit 21, the basic information is written into the information field of an ATM cell in accordance with a prescribed format; likewise, in the cell assembling unit 22 the detail information is written as information to be carried in another ATM cell. A "0" is written to the CLP in the header of the former cell to assign to it the lower cell-discard priority, while on the other hand, a "1" is written to the CLP in the header of the latter cell to give it the higher cell-discard priority. Therefore, when congestion occurs, the latter cell, i.e., the detail information cell, is discarded in preference to the basic information cell. In this case, the basic information cell, i.e., the former cell, is effectively transmitted so that the receiving side can extract the voice information at the segment level from the segment information. This ensures voice quality of the minimum acceptable level. It is also possible to control the voice quality by varying the bit allocation between the basic information and the detail information.

The basic information multiplexing unit 25 and the detail information multiplexing unit 26 in FIG. 20 are provided to prevent the cell utilization efficiency from dropping when transmitting voice data in cells and thereby to prevent the occurrence of congestion. For example, when handling digital voice data of 64 Kb/s sampled at 8 kHz, one cell can carry only 4 bytes at most (125 $\mu$s (at 8 kHz sampling rate)×4 bytes=0.5 ms delay) per voice channel because of a limit to the acceptable voice delay time. This greatly reduces the utilization efficiency of cells each of which can carry up to 48 bytes in its information field, and consequently requires an increased number of cells for transmission of a given amount of information. The basic information multiplexing unit 25 and the detail information multiplexing unit 26 each combine a plurality of units of voice channel data into one cell and perform multiplexed transmission of voice channels. This increases the cell utilization efficiency and reduces the number of cells required for transmission of the voice data, achieving the effect of preventing the occurrence of congestion.

Before proceeding to a detailed description of the embodiments of the invention illustrated in FIGS. 19 and 20, the embodiment of FIG. 19 will first be described briefly with reference to FIGS. 25 and 26.

As previously described, the embodiment of FIG. 19 ensures voice quality of the minimum acceptable level in the event of congestion. In the case of image information, for example, image information for videotelephone and videoconferencing, based on image coding technology as defined by CCITT H.261, is divided into frames encoded by extracting image motion and frames encoded by extracting detail differences between frames, and therefore, by assigning CLP=0 to the former frames and CLP=1 to the latter frames, image quality of the minimum acceptable level can be ensured against cell-loss situations due to congestion, as in the case of voice information.

Figure 25:
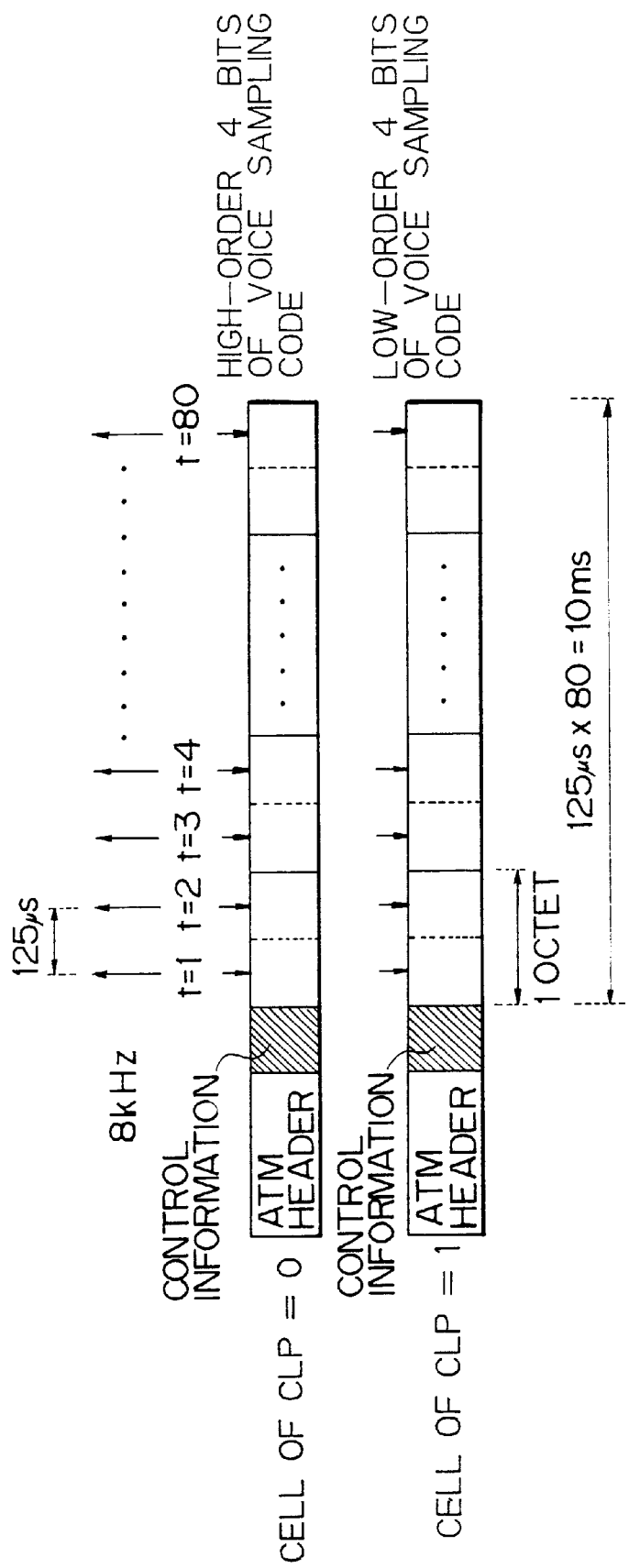
FIG. 25 is a diagram for explaining the transmission delay of a voice signal.
Figure 26:
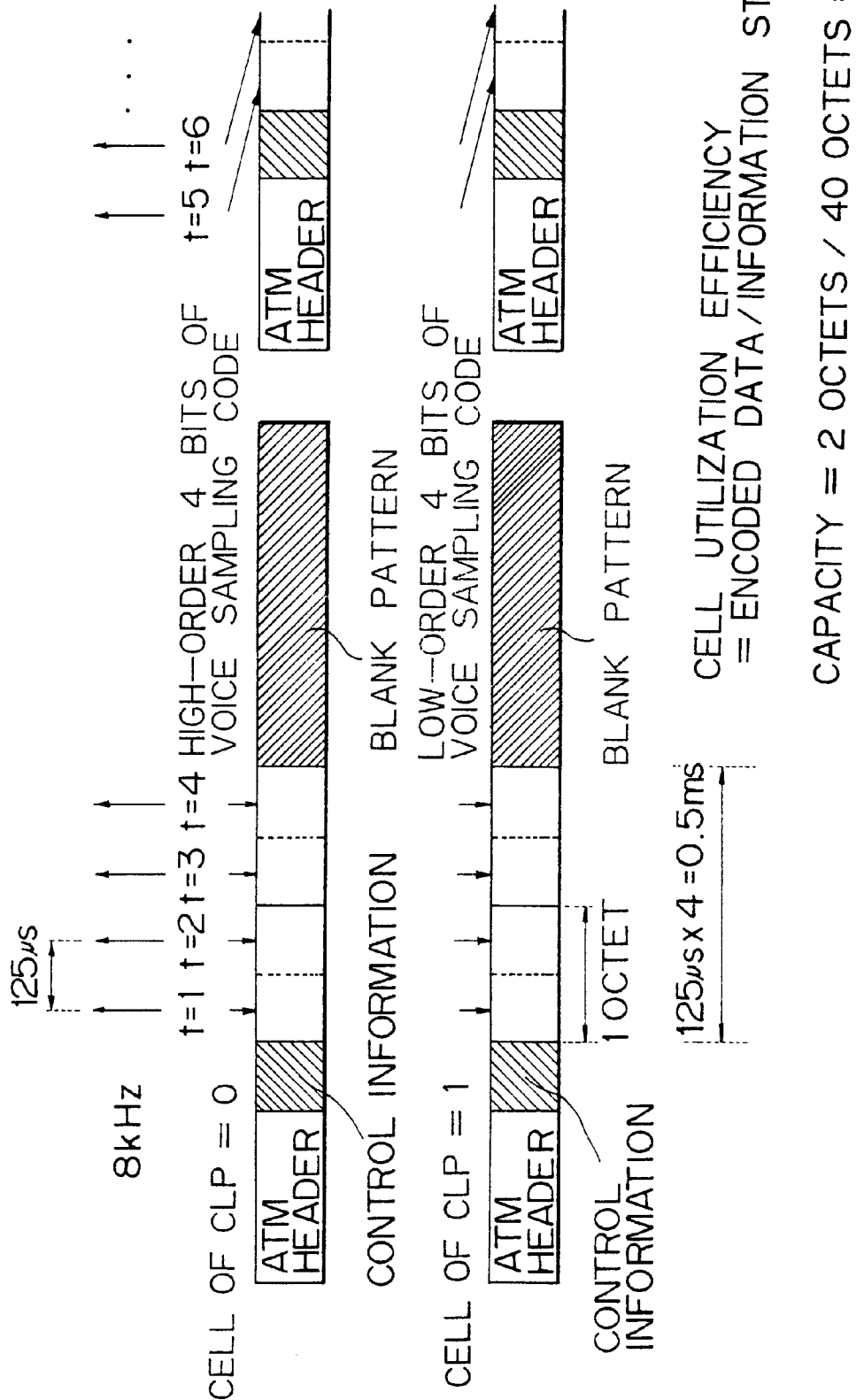
FIG. 26 is a diagram for explaining voice cell utilization efficiency.

However, as shown in FIGS. 25 and 26, the embodiment of FIG. 19, when implemented as is, will involve the following problems because of transmission delay time of voice signals.

FIG. 25 shows an example in which 40-octet user information is carried in the user information field of the ATM cell. When using 64 Kb/s PCM coded data, for example, the information is sampled at a rate of 8 kHz into eight-bit coded data. In this case, it will take 40 ×125 μs=5 ms to complete data write for one cell, and further, if the information is to be divided into the high-order four bits for basic information and the low-order four bits for detail information and if two cells of different CLPs are each to be loaded with 40-octet information, the delay time will be doubled to 10 ms which will be intolerable. FIG. 25 explains the above point in graphical form.

FIG. 26 is a diagram for explaining the problem that when it is attempted to keep the transmission delay time of a voice signal within an allowable limit, then the voice cell utilization will drop.

For example, if a cell is assembled for every four samples of voice data (delay time is 0.5 ms), the cell will be loaded only with four-octet coded voice data, leaving the remaining 36-octet space unused, and thus reducing the cell utilization efficiency to 4/40=10%. Furthermore, if the data is divided between two cells of different CLPs, the cell utilization efficiency will further drop to 5%. Besides the problem of the utilization efficiency, this could easily cause congestion since two times as many cells are sent out. FIG. 26 explains the above point in graphical form.

The invention illustrated in FIG. 20, i.e., multiplexing, has thus been devised to overcome the above problems. By multiplexing, it is possible to simultaneously realize shortening of the delay time, improvement of the cell utilization efficiency, prevention of congestion, etc., while retaining the advantages, such as ensured voice quality, offered by the embodiment of FIG. 19.

Figure 21:
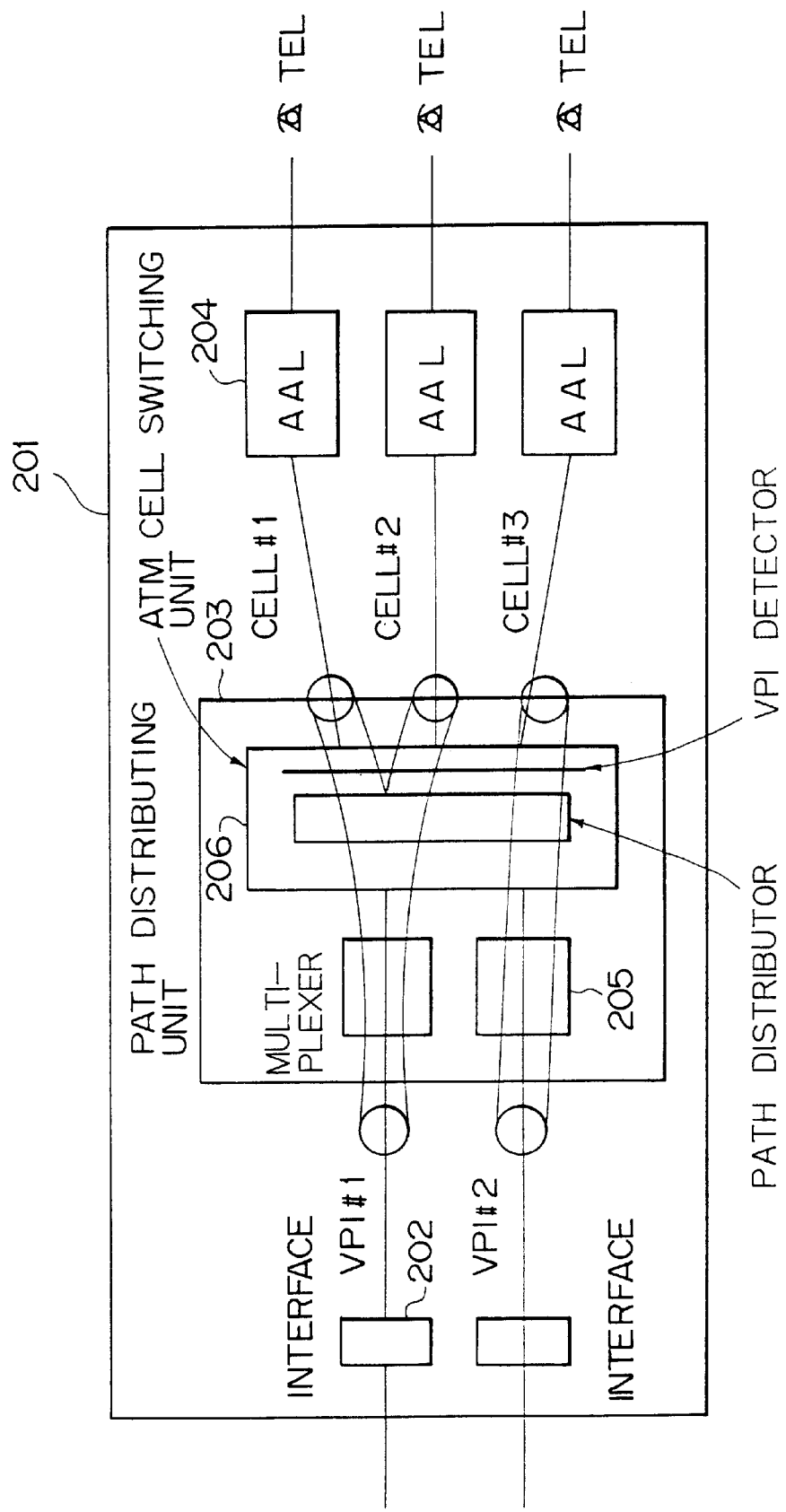
FIG. 21 is a block diagram illustrating an embodiment (1) of the cell-discard control apparatus of the invention show in FIG. 20.

FIG. 21 illustrates one embodiment of the invention implementing the cell-discard control apparatus of FIG. 20. Except for a multiplexing unit 205 provided in a communication node 201, the configuration of FIG. 21 is the same as that of the cell-discard control apparatus of the embodiment shown in FIG. 19. The multiplexing section 205 is effective, for example, in the case of cells of several bytes such as voice cells for which the amount of information is relatively small. On the other hand, multiplexing is not so effective in the case of image or video cells for which the amount of information is large enough to fill the entire information field.

In comparison with FIGS. 19 and 20, each AAL 204 of FIG. 21 corresponds to the encoding unit 24, information dividing unit 23, basic information cell assembling unit 21, and detail information cell assembling unit 22 shown in FIGS. 19 and 20, and the multiplexing unit 205 of FIG. 21 corresponds to the basic information multiplexing unit 25 and detail information multiplexing unit 26 in FIG. 20. Further, the interface unit 202 and a cell-discard unit (not shown) in the path diverter 203 of FIG. 21 correspond to the cell output unit 20, 27 shown in FIGS. 19 and 20.

The ATM switching unit 206 of FIG. 21 may be disposed at one of various positions in FIG. 19 and 20. In the example of FIG. 21, the ATM switching unit 206 is interposed between the pair of cell assembling unit 21, 22 and the pair of multiplexing units 25, 26 in FIG. 20, but alternatively, it may be placed between the information dividing unit 23 and the encoding unit 24 in FIGS. 19 and 20. The ATM switching unit 206 has the function of combining cells having the same VPI intended for transmission along the same path, as a preparatory step for multiplexing by the multiplexing unit 205 at the next stage. The interface unit 202 performs NNI interfacing if the communication node 201 is an intermediate node, and UNI interfacing to a network station if it is a PBX.

Figure 22B:
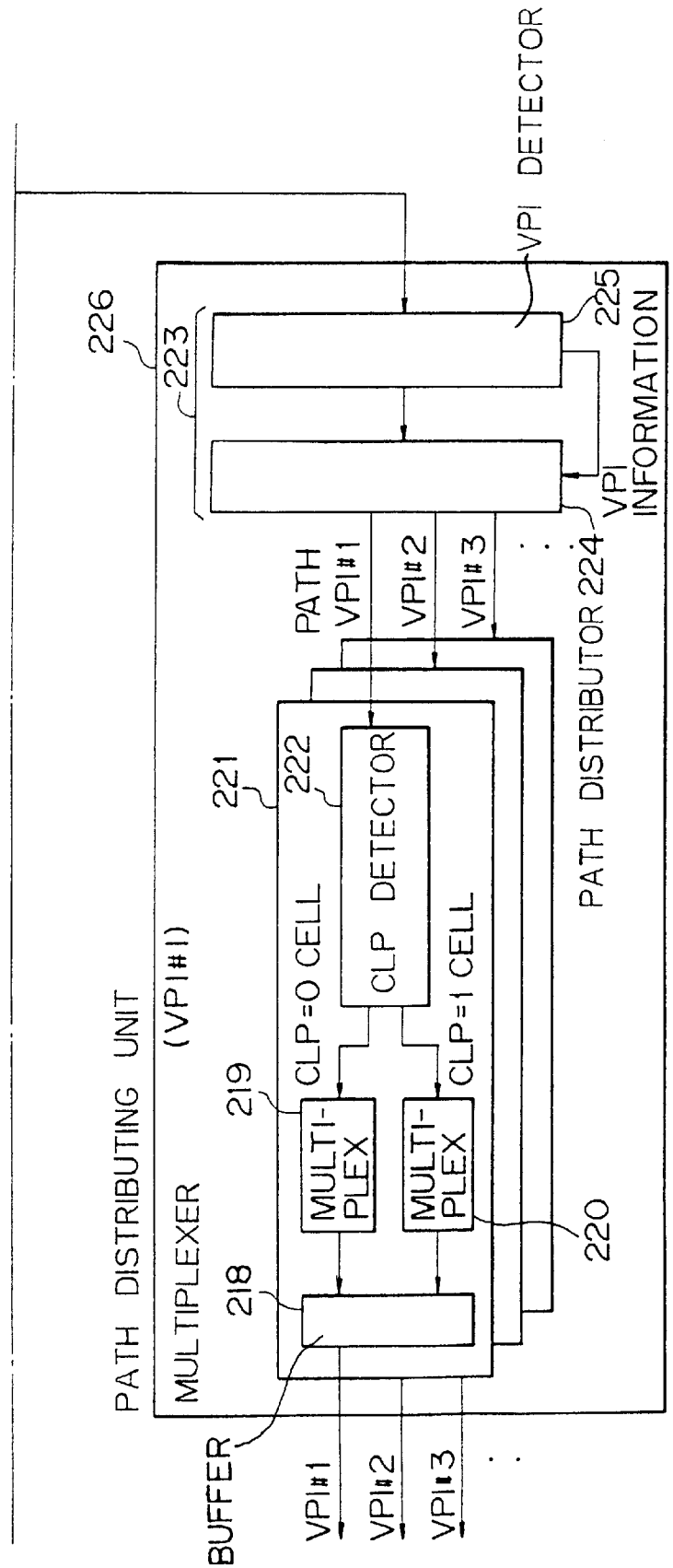
Figure 23B:
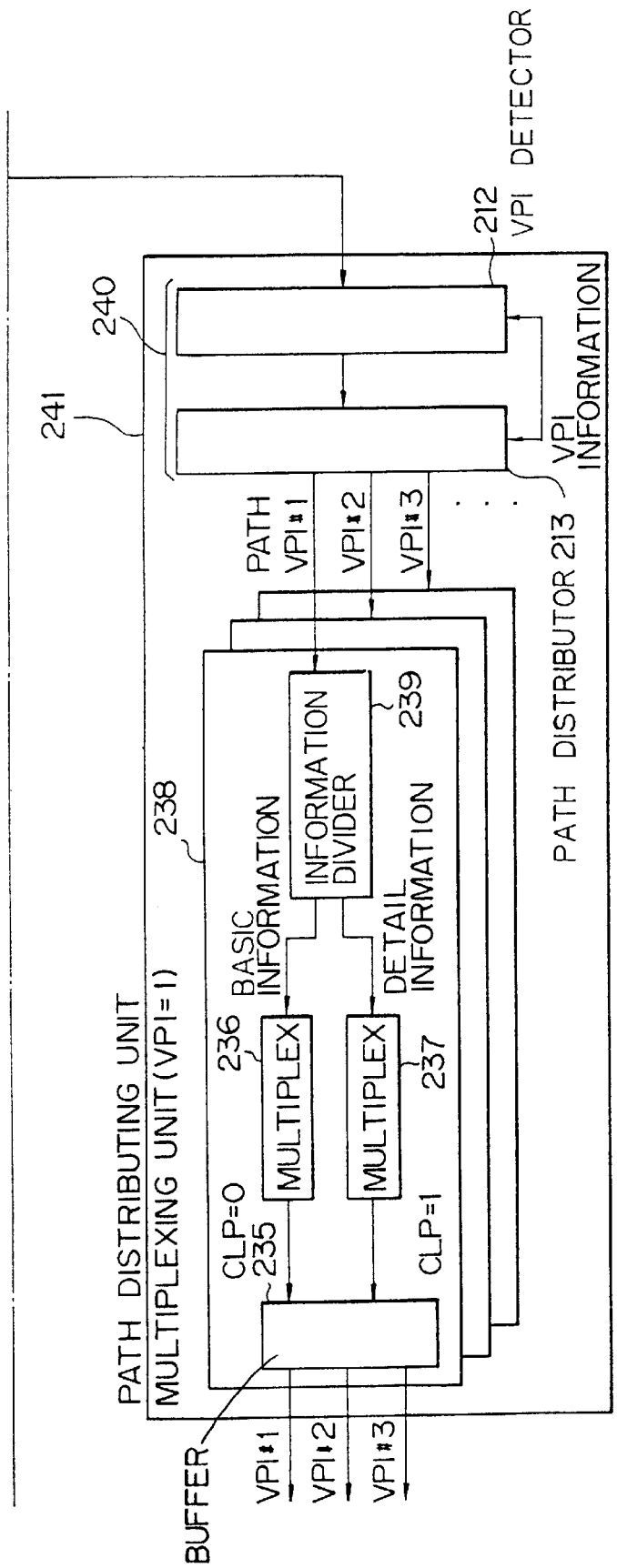

FIGS. 22 and 23 illustrate embodiments of the cell-discard control apparatus of the invention wherein the position of the ATM switching unit is changed as described above. FIG. 22 concerns an example in which the ATM switching unit is interposed between the basic/detail information cell assembling unit and the basic/detail information multiplexing unit, whereas FIG. 23 shows an example in which the ATM switching unit is placed between the cell assembling unit and the information dividing unit.

Referring to FIG. 22, an encoder 216 encodes a voice signal or image information in accordance with a prescribed coding scheme. An information divider 215 divides the data encoded by the encoder 216 into basic information data consisting of a vital information part of the data and detail information data consisting of a detail or redundant information part as distinguished from the vital information part. A basic information cell assembler 212 assembles the basic information data into basic information cells and sets their CLP bit to "0". A detail information cell assembler 213 assembles the detail information data into detail information cells and sets their CLP to "1". A buffer 211 accepts the basic information cells from the basic information cell assembler 212 and the detail information cells from the detail information cell assembler 213, and directs them to a path interface 223 (corresponding to the ATM switching unit).

The path interface 214 directs the basic information cells and detail information cells, transferred from the cell assembling unit 214, to virtual paths designated by their virtual path identifiers (VPIs). A CLP detector 222 separates the basic information cells and detail information cells, transferred from the path interface 223 via the same virtual path, according to their CLP value; the basic information cells (CLP=0) of a plurality of channels separated by the CLP detector 222 are fed to a basic information multiplexer 219 where the information is combined into a basic information multiplexed cell for transmission.

On the other hand, the detail information cells (CLP=1) of a plurality of channels separated by the CLP detector 222 are fed to a detail information multiplexer 220 where the information is combined into a detail information multiplexed cell for transmission. A buffer 218 accepts the basic information multiplexed cell from the basic information multiplexer 219 and the detail information multiplexed cell from the detail information multiplexer 220, and outputs them onto the designated virtual path. In the event of congestion encountered along the path, the buffer 218 preferentially discards the detail information multiplexed cell. This embodiment is effective when encoded data of large size, such as video data, are mixed on the system and when such data are assembled into cells of CLP=0 and CLP=1, but not multiplexed for transmission.

Turning next to the embodiment of FIG. 23, an encoder 234 encodes a voice signal or image information in accordance with a prescribed coding scheme. An ATM cell assembler 232 assembles the data encoded by the encoder 234 into cells, and a buffer 231 directs the cells assembled by the ATM cell assembler 232 to a path interface 240. The path interface 240 distributes the cells assembled in the cell assembling unit 233 to the virtual paths designated by their virtual path identifiers (VPI).

An information divider 239 contained in a multiplexing unit 238 divides the cell data, transferred from the path interface 240 via the same virtual path, into basic information data consisting of a vital information part of the data and detail information data consisting of a detail or redundant information part as distinguished from the vital information part. A basic information multiplexer 236 combines the basic information data of a plurality of channels supplied from the information divider 239 into a basic information multiplexed cell with its CLP bit set to "0" for transmission. On the other hand, a detail information multiplexer 237 combines the detail information data of a plurality of channels supplied from the information divider 239 into a detail information multiplexed cell with its CLP bit set to "1" for transmission. A buffer 235 accepts the basic information multiplexed cell from the basic information multiplexer 236 and the detail information multiplexed cell from the detail information multiplexer 237, and outputs them onto the designated virtual path. In the event of congestion encountered along the path, the buffer 235 preferentially discards the detail information multiplexed cell. This embodiment is effective when there are not many cells to be multiplexed, in the extreme case, only one cell, and when a better result is expected by not grouping the cells into CLP=0 and CLP=1.

Figure 24:
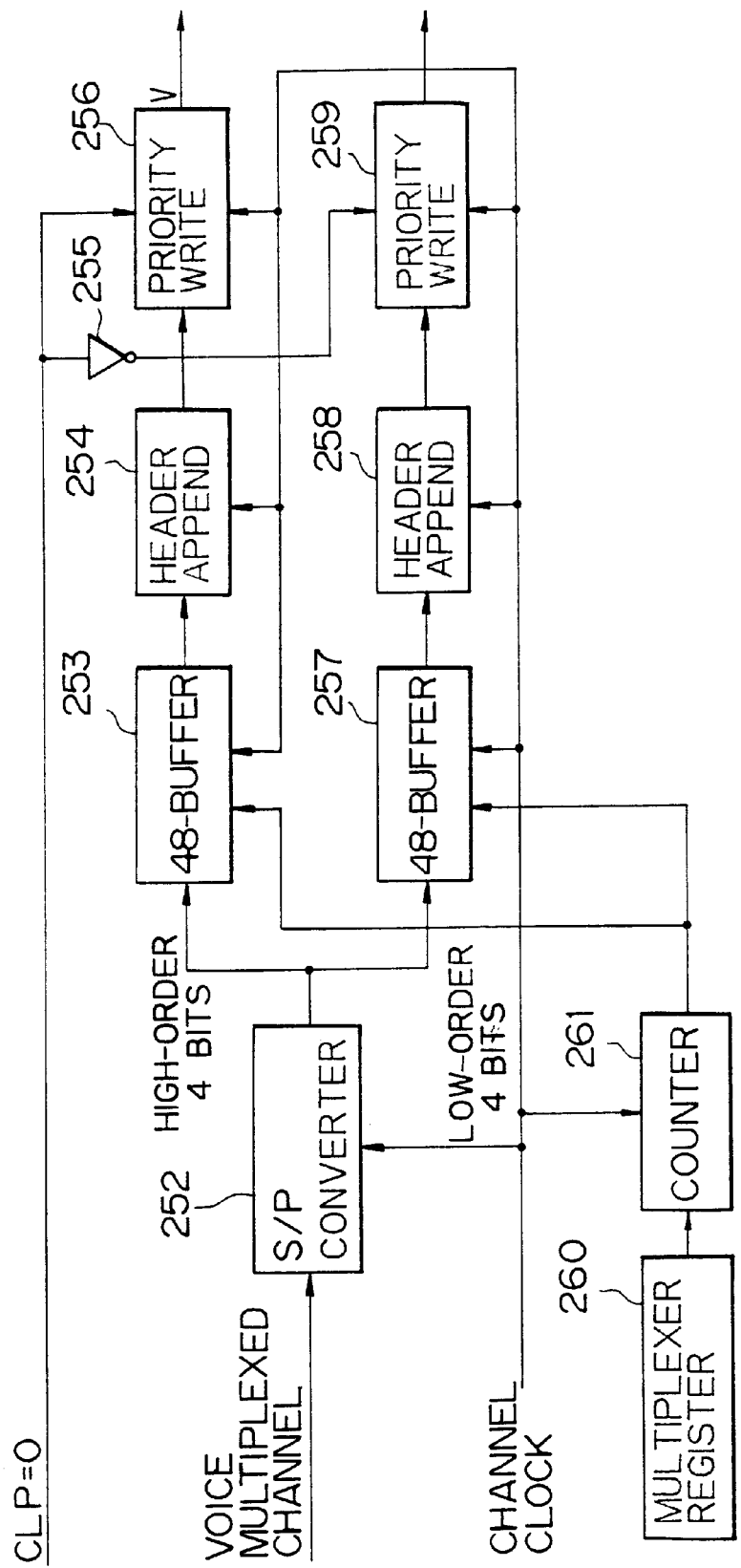
FIG. 24 is a circuit block diagram illustrating a configuration of a information divider, cell assembler, and multiplexer.

FIG. 24 is a simplified block diagram showing an example of the circuit configuration of the information divider, cell assembler, and multiplexer shown in FIG. 22 or 23.

In FIG. 24, a serial digital signal on which a plurality of voice channels are time-division multiplexed, for example, is sequentially converted by a serial/parallel converter (S/P) 252 into an eight-bit parallel signal for each voice channel in synchronism with a channel clock that is output at a time slot frequency of each voice channel. The high-order four bits of the eight-bit parallel signal are written as basic information into a 48-byte buffer 253 in the upper section, and the low-order four bits are written as detail information into a 48-byte buffer 257 in the lower section.

A multiplexer register 260 contains a count value indicating the degree of voice channel multiplexing designated from the system. A counter circuit 261 at the next stage is initially loaded with the count value, and is decremented by 1 each time the channel clock is input. When the value of the counter circuit 261 reaches zero, the counter circuit 261 outputs a signal notifying the count end to the upper and lower 48-byte buffers 253, 257, upon which the counter circuit 261 is reloaded with the count value to initiate the same counting operation. Upon receiving the signal, the 48-byte buffers 253, 257 output the stored data of the plurality of voice channels corresponding to the degree of multiplexing. The output data are fed to header appending circuits 254, 258 which append headers having the same VPI to the data. The header-appended data are further fed to priority writing circuits 256, 259 where CLP=0 is written to the basic information multiplexed cell in the upper section and CLP=1 written to the detail information multiplexed cell in the lower section.

As described above, according to the invention, voice cells are assigned with the higher discard priority at prescribed intervals of time or at intervals of a prescribed number of voice cells without causing such level differences as would be heard as noise. The invention therefore prevents a sequential set of voice cells from being discarded in bursty cell-loss situations that may be caused by congestion along a communication path.

This prevents such troubles as abrupt loss of voice, generation of noise, intermittent interruption of voice, etc. during communication, and thus enhances articulation during voice communication.

According to the invention, voice cells are grouped into basic information cells and detail information cells. This prevents interruption of voice that may be caused by bursty loss of cells in the event of congestion, and ensures voice quality of the minimum acceptable level even if a cell-loss situation is encountered.

Furthermore, according to the invention, the basic information cells and the detail information cells are respectively multiplexed, which serves not only to greatly improve the cell utilization efficiency but also to reduce the number of cells required for transmission of voice information, thus permitting congestion control capable of preventing occurrence of congestion.

Moreover, it is possible to secure optimum voice quality to match various situations by changing the proportion between the basic information and the detail information and increasing the amount of the basic information, for example.

What is claimed is:

1. A cell-discard control apparatus, comprising:
   cell assembling means for assembling a voice signal into cells for transmission;
   memory means containing a pulse count value for setting priority at a prescribed interval of time;
   counting means for comparing said pulse count value with an external timing pulse count, and for outputting a count end signal when said external timing pulse count equals said pulse count value; and
   priority appending means for generating a cell-discard priority appending signal, and for applying said cell-discard priority appending signal to said cell assembling means in response to said count end signal from said counting means.

2. A cell-discard control apparatus, comprising:
   cell assembling means for assembling a voice signal into cells and for outputting a timing pulse as each cell is generated;
   memory means containing a cell count value for setting priority for every prescribed number of cells;
   counting means for comparing said cell count value with a timing pulse count from said cell assembling means and for outputting a count end signal when said timing pulse count equals said pulse count value; and
   priority appending means for generating a cell-discard priority signal, and for applying said cell-discard priority appending signal to said cell assembling means in response to said count end signal from said counting means.

3. A cell-discard control apparatus, comprising:
   cell assembling means for assembling a voice signal into cells and for outputting a voice signal level of each cell;
   level detecting means for detecting said voice signal level of each cell output from said cell assembling means, for outputting the detected voice signal level of each cell, and for temporarily holding a previous detected voice signal level and a present detected voice signal level;
   comparing means for comparing said present detected signal level output from said level detecting means with said previous detected signal level; and
   priority appending means for generating a cell-discard priority appending signal, and for applying said cell-discard priority appending signal to said cell assembling means when a level comparison output from said comparing means is below a prescribed level.

4. A method of determining cell-discard priority in asynchronous transfer mode (ATM) communication, comprising:
   counting a prescribed number of timing pulses;
   generating a cell-discard instructing signal for a voice cell when said prescribed number of timing pulses is reached; and assigning high cell-discard priority to a voice cell being generated at the time of the issuance of said cell-discard instructing signal.

5. A method of determining cell-discard priority in asynchronous transfer mode (ATM) communication, comprising:
detecting a voice level of a generated voice cell and temporarily holding said voice level;
comparing said detected voice level with a previous voice level temporarily being held;
generating a cell-discard instructing signal for a voice cell only when the voice level difference obtained as a result of the comparison is below a prescribed value; and
assigning high cell-discard priority to a voice cell being generated at the time of the issuance of said cell-discard instructing signal.

6. A cell-discard control apparatus for discarding cells of image signals in accordance with prescribed priority, comprising:
encoding means for encoding an image signal as data;
information dividing means for dividing the data encoded by said encoding means into basic information data consisting of a vital information part of said data and detail information data consisting of a detail information part as distinguished from said vital information part;
first type cell assembling means for assembling said basic information data into first type cells, each first type cell being of fixed length, having a priority information and for setting the priority information of each first type cell to a first fixed priority level during a communication;
second type cell assembling means for assembling said detail information data into second type cells, each second type cell having a priority information and for setting the priority information of each second type cell to a second fixed priority level which is higher than the first fixed priority level during a communication, said first and second fixed priority levels being fixed from the beginning to the end of a communication; and
cell output means for outputting the first type cells supplied from said first type cell assembling means and the second type cells supplied from said second type cell assembling means and for preferentially discarding the second type cells identified by priority information equal to the second fixed priority level in the event of congestion.

7. A cell-discard control apparatus for discarding cells of at least one of voice and image signals in accordance with prescribed priority, comprising:
encoding means for encoding at least one of a voice signal and an image signal as data;
information dividing means for dividing the data encoded by said encoding means into basic information data consisting of a vital information part of said data and detail information data consisting of a detail information part as distinguished from said vital information part;
first type cell assembling means for assembling said basic information data into first type cells, each first type cell having a priority information and for setting each priority information of each first type cell to a first priority level;
second type cell assembling means for assembling said detail information data into second type cells, each second type cell having a priority information and for setting each priority information of each second type cell to a second priority level which is higher than the first priority level;
basic information multiplexing means for multiplexing information carried in said first type cells into a first type multiplexed cell for transmission;
detail information multiplexing means for multiplexing information carried in said second type cells of said plurality of channels into a second type multiplexed cell for transmission; and
cell output means for outputting said first type multiplexed cell supplied from said basic information multiplexing means and said second type multiplexed cell supplied from said detail information multiplexing means and for preferentially discarding said second type multiplexed cell identified by priority information equal to the second priority level in the event of congestion.

8. A cell-discard control apparatus for discarding cells of at least one of voice and image signals in accordance with prescribed priority, comprising:
an encoding unit encoding at least one of a voice signal and an image signal as data;
a cell assembling unit assembling the data encoded by said encoding unit into first type cells carrying a vital information part of said data and second type cells carrying a detail information part of said data as distinguished from said vital information part, each first type cell and each second type cell having a priority information, the priority information being set to a first priority level for said first type cells and a second priority level which is higher than the first priority level, for said second type cells by said cell assembling unit;
a path interface unit, connected to the cell assembling unit, directing said first type cells and said second type cells, transferred from said cell assembling unit, to virtual paths designated by virtual path identifiers carried in said first type cells and said second type cells; and
a path diverter unit separating said first type cells and said second type cells, transferred from said path interface unit, according to priority information multiplexing information carried in said first type cells into a third type cell for transmission, multiplexing information carried in said second type cells into a fourth type cell for transmission, and for preferentially discarding said fourth type cell identified by priority information equal to the second priority level in the event of congestion.

9. A cell-discard control apparatus according to claim 8, wherein said cell assembling unit comprises:
an information dividing unit for dividing the data encoded by said encoding unit into basic information data including the vital information part of said data and detail information data including the detail information part as distinguished from said vital information part;
a first type cell assembling unit assembling said basic information data into the first type cells and for setting each priority information to the first priority level;
a second type cell assembling unit assembling said detail information data into the second type cells and for setting each priority information to the second priority level; and
a buffer accepting said first type cells from said first type cell assembling unit and said second type cells from said second type cell assembling unit and for directing them to said path interface unit.

10. A cell-discard control apparatus according to claim 8, wherein said path diverter unit comprises:

a priority information detecting unit separating said first type cells and said second type cells, transferred from said path interface unit, according to priority level;

a first multiplexing unit multiplexing said first type cells of the plurality of channels separated by said priority information detecting unit into a third type cell for transmission;

a multiplexing unit multiplexing said second type cells of said plurality of channels separated by said priority information detecting unit into a fourth type cell for transmission; and a buffering unit accepting said third type cell from said first multiplexing unit and said fourth type cell from said second multiplexing unit, outputting said third type cell and said fourth type cell to said virtual paths, and preferentially discarding said fourth type cell in the event of congestion.

11. A cell-discard control apparatus for discarding cells of at least one of voice and image signals in accordance with prescribed priority, comprising:

an encoding unit encoding at least one of a voice signal and an image signal as data;

a cell assembling unit assembling the data encoded by said encoding unit into cells, each cell having a priority information;

a path interface unit, connected to the cell assembling unit, directing said cells assembled by said cell assembling unit to virtual paths designated by virtual path identifiers carried in said cells; and a path diverter unit, connected to the path interface unit, dividing data of said cells, transferred from said path interface unit via the same virtual path, into basic information data consisting of a vital information part of said data and detail information data consisting of a detail information part as distinguished from said vital information part, multiplexing said basic information data into a first type cell with priority information set to a first priority level, multiplexing said detail information data into a second type cell with priority information set to a second priority level which is higher than the first priority level, outputting said first type cell and said second type cell onto said designated virtual paths, designated by virtual path identifiers and preferentially discarding said second type cell identified by priority information equal to the second priority level in the event of congestion.

12. A cell-discard control apparatus according to claim 11, wherein said cell assembling unit comprises:

an ATM cell assembling unit assembling the data encoded by said encoding unit into cells; and a buffering unit directing said cells assembled by said ATM cell assembling unit to said path interface unit.

13. A cell-discard control apparatus according to claim 11, wherein said path diverter unit comprises:

an information dividing unit dividing data of said cells, transferred from said path interface unit via the same virtual path, into the basic information data consisting of the vital information part of said data and the detail information data consisting of the detail information part as distinguished from said vital information part;

a first multiplexing unit multiplexing said basic information data of a plurality of channels supplied from said dividing unit into the first type cell with priority information set to the first priority level for transmission;

a second multiplexing unit multiplexing said detail information data of a plurality of channels supplied from said dividing unit into the second type cell with priority information set to the second priority level for transmission; and a buffering unit accepting said first type cell from said first multiplexing unit and said second type cell from said second multiplexing unit, outputting said first type cell and said second type cell to said virtual paths, and preferentially discarding said second type cell in the event of congestion.

14. A method of determining cell-discard priority in asynchronous transfer mode (ATM) communication, comprising:

counting the number of voice cells generated;

generating a cell-discard instructing signal for a voice cell intermittently for every prescribed number of voice cells; and assigning high cell-discard priority to a voice cell being generated at the time of the issuance of said cell-discard instructing signal.

\* \* \* \* \*